(12) United States Patent
Yamazaki et al.

(10) Patent No.: US 6,879,343 B2
(45) Date of Patent: Apr. 12, 2005

(54) AUTOMATIC FOCUS ADJUSTING DEVICE

(75) Inventors: Tatsuya Yamazaki, Tokyo (JP); Taeko Tanaka, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 09/810,380

(22) Filed: Mar. 16, 2001

(65) Prior Publication Data

US 2002/0154909 A1 Oct. 24, 2002

Related U.S. Application Data

(62) Division of application No. 08/811,162, filed on Mar. 4, 1997, now Pat. No. 6,222,588, which is a continuation of application No. 08/248,328, filed on May 24, 1994, now abandoned.

(30) Foreign Application Priority Data

May 31, 1993 (JP) ............................................ 05-129374
May 28, 1993 (JP) ............................................ 05-127085

(51) Int. Cl.[7] ............................................. H04N 5/217
(52) U.S. Cl. ....................................... 348/351; 348/354
(58) Field of Search .................... 348/207.99, 345–356, 348/220.1; 396/89, 90, 91

(56) References Cited

U.S. PATENT DOCUMENTS

| 4,853,788 A | * | 8/1989 | Murashima et al. | ........ 348/355 |
| 4,980,773 A | * | 12/1990 | Suda et al. | ................. 348/355 |
| 5,319,462 A | * | 6/1994 | Haruki et al. | ................ 348/347 |
| 5,325,146 A | * | 6/1994 | Toji | ............................. 396/81 |
| 6,512,549 B1 | * | 1/2003 | Iijima et al. | ................. 348/349 |

* cited by examiner

Primary Examiner—Tuan Ho
(74) Attorney, Agent, or Firm—Cowan Liebowitz & Latman, P.C.

(57) ABSTRACT

An automatic focusing device includes an extracting circuit which extracts a focus signal corresponding to a degree of focus from a picked-up image signal, a focusing lens and a direction deciding circuit which decides the direction of driving the focusing lens on the basis of the output of the extraction circuit when the state of focus deviates from an in-focus state. The extracting circuit is arranged to simultaneously extract a plurality of focus signals having different frequency components from each other. The direction deciding circuit is arranged to perform computing operations on the focus signals separately from each other with respect to the focusing lens driving direction and to decide the focusing lens driving direction when the results of the computing operations come to coincide with each other.

7 Claims, 19 Drawing Sheets

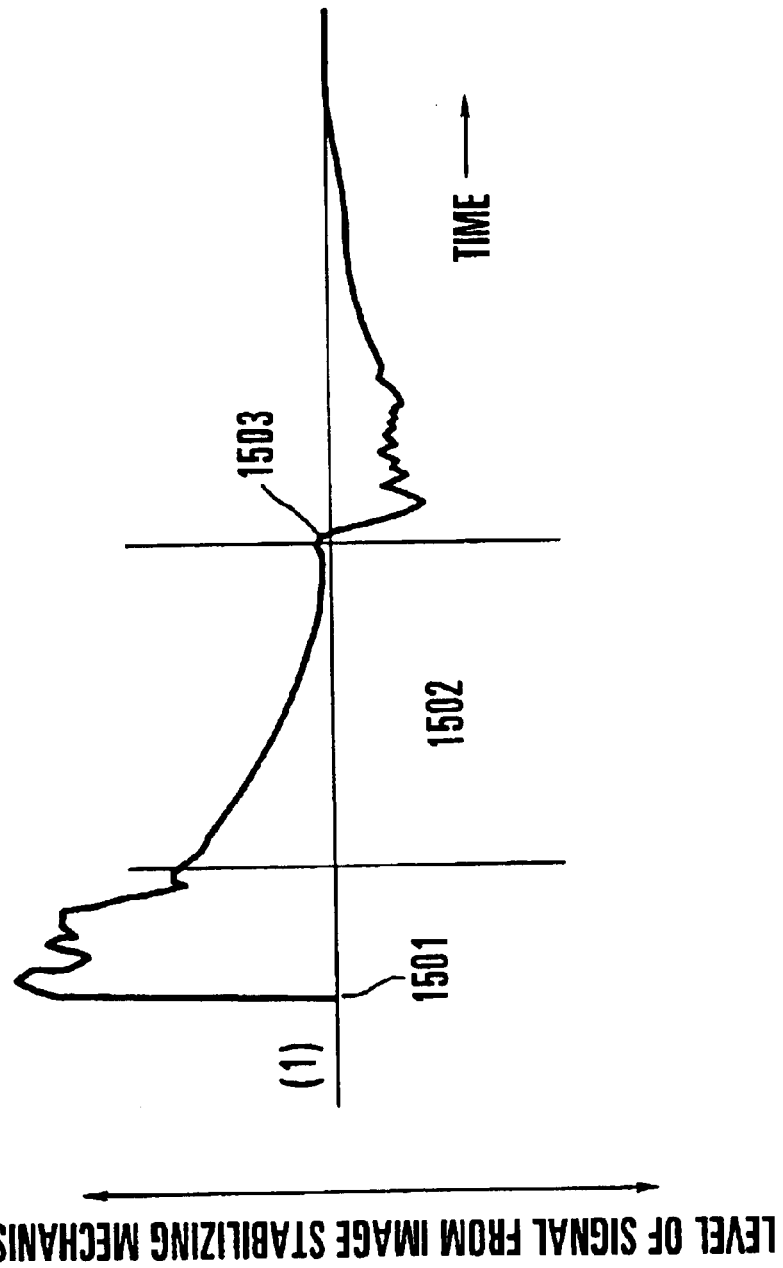

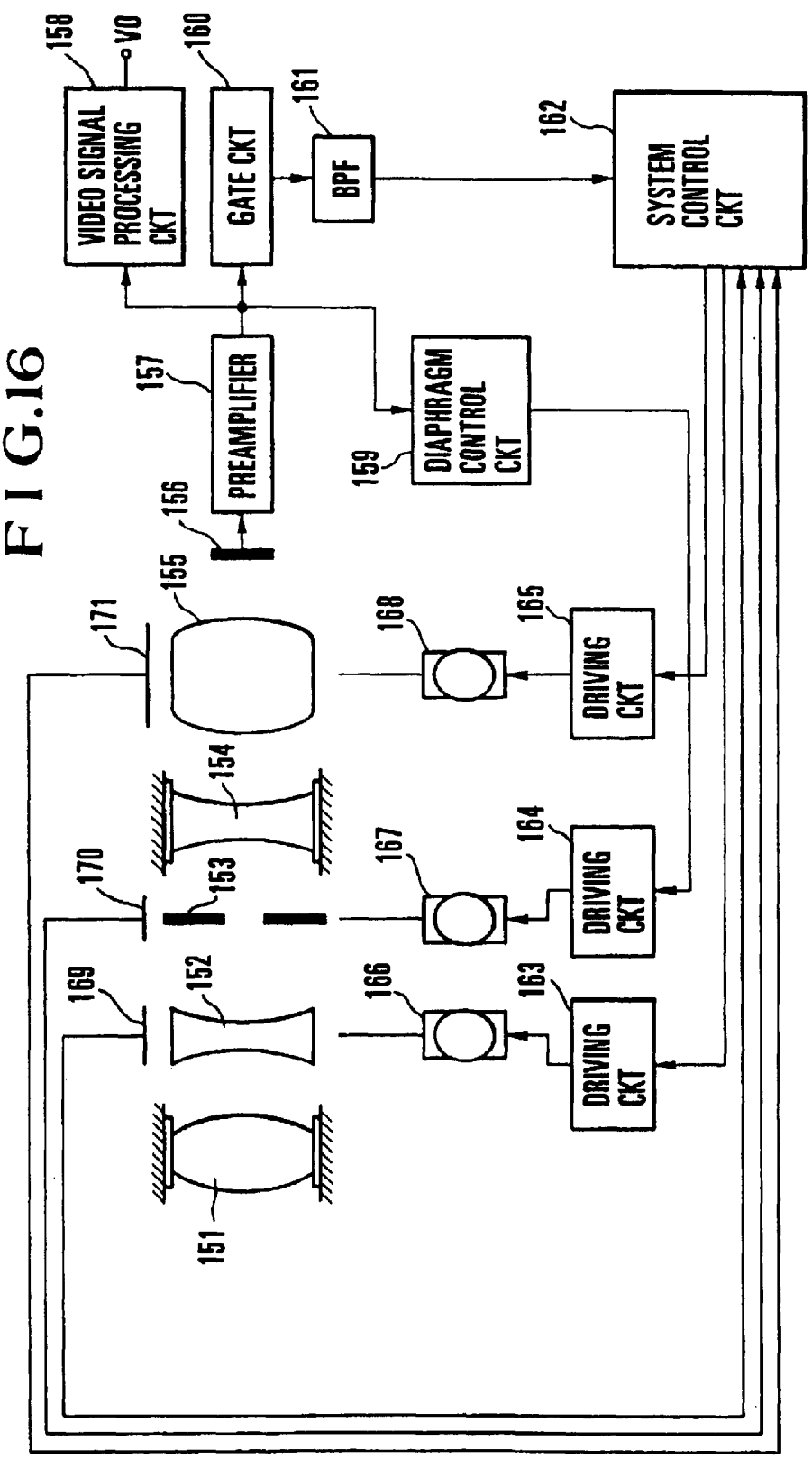

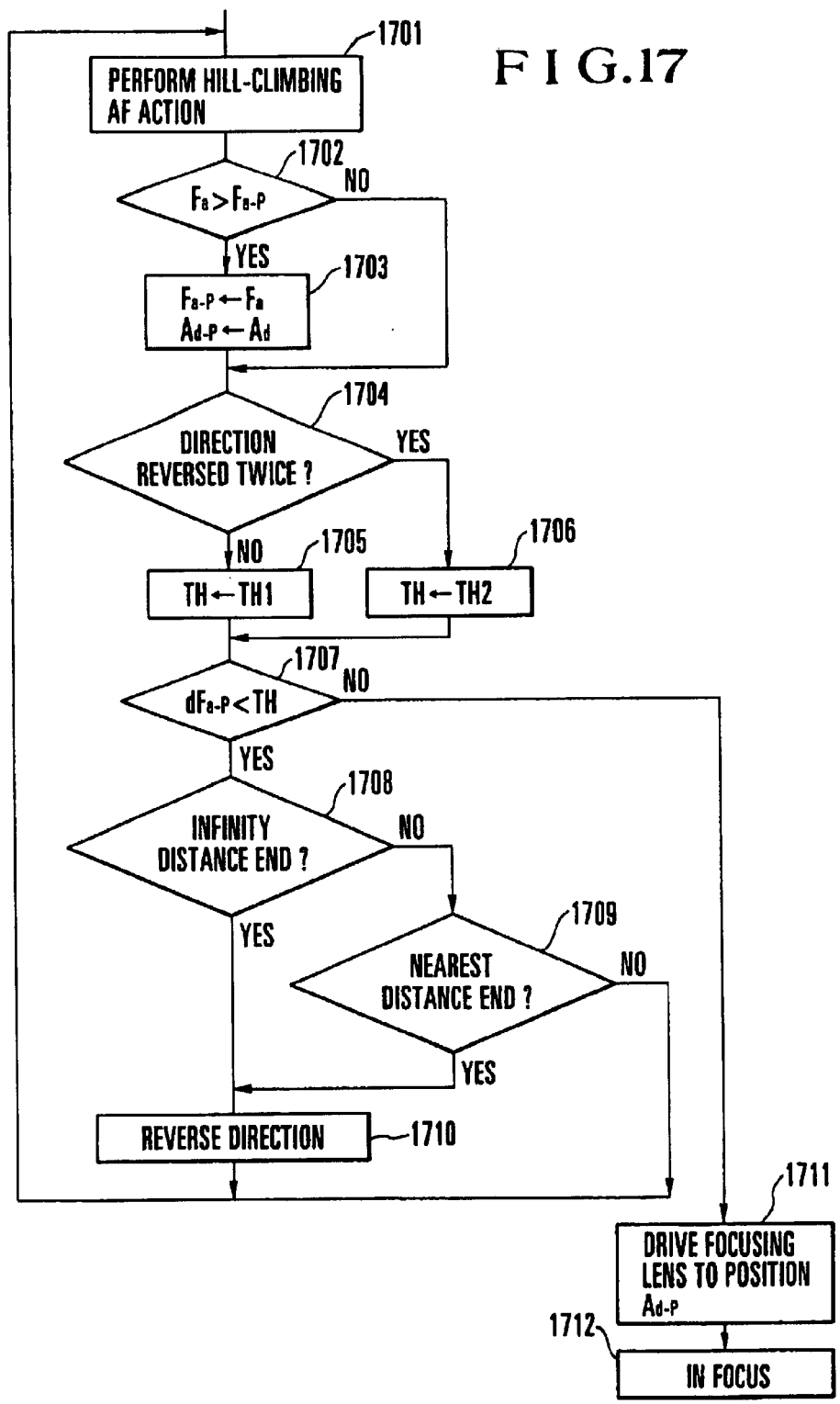

FIG.18(a)

LEVEL OF DEPTH OF FIELD OBTAINED BY FRONT LENS

| FOCAL LENGTH \ APERTURE | 1.4 ~2.0 | ~2.8 | ~4.0 | ~5.6 | ~8.0 | ~11.0 | ~ |
|---|---|---|---|---|---|---|---|
| 80~58mm | 0 | 0 | 1 | 1 | 2 | 2 | 3 |
| ~40 | 1 | 1 | 2 | 3 | 3 | 3 | 4 |
| ~28 | 2 | 2 | 3 | 3 | 4 | 4 | 5 |
| ~20 | 3 | 3 | 4 | 4 | 5 | 5 | 5 |
| ~14 | 4 | 4 | 5 | 5 | 6 | 6 | 6 |
| ~8 | 5 | 5 | 6 | 6 | 6 | 6 | 6 |

FIG.18(b)

LEVEL OF DEPTH OF FIELD OBTAINED BY REAR-FOCUS LENS

| APERTURE | 1.4 ~2.0 | ~2.8 | ~4.0 | ~5.6 | ~8.0 | ~11.0 | ~ |
|---|---|---|---|---|---|---|---|
| LEVEL OF DEPTH OF FIELD | 1 | 1 | 2 | 2 | 3 | 3 | 4 |

FIG.18(c)

TH2 FOR LEVELS OF DEPTH OF FIELD

| LEVEL OF DEPTH OF FIELD | 1 | 2 | 3 | 4 | 5 | 6 |
|---|---|---|---|---|---|---|
| TH2 (RATIO TO TH1) | 0.7 | 0.6 | 0.6 | 0.5 | 0.5 | 0.4 |

AUTOMATIC FOCUS ADJUSTING DEVICE

This is a div. of Ser. No. 08/811,162 filed Mar. 4, 1997 now U.S. Pat. No. 6,222,588 which is con. of Ser. No. 08/248,328 filed May 24, 1994 now abandoned.

BACKGROUND OF THE INVENTION

1. Field of the Invention

This invention relates to an automatic focus adjusting device.

2. Description of the Related Art

The advancement of technology related to various video apparatuses including video cameras, electronic cameras, etc., have been remarkable during recent years. As a result, it has become a standard practice to provide these apparatus with an automatic focus adjusting (AF) function for improvement in performance and operability.

According to a focusing method most popularly employed for the automatic focus adjusting (focusing) devices of these apparatuses, the sharpness of a picture is detected from a video signal obtained through photoelectric conversion by an image sensor or the like and then the position of a focusing lens is controlled and adjusted in such a way as to make the detected sharpness into a maximum degree.

The degree of sharpness is represented by a sharpness signal. The sharpness signal is evaluated in general either by detecting the intensity of a high frequency component extracted from a video signal through a band-pass filter (hereinafter referred to as BPF) or by detecting the width of blur of the video signal (width of the edge part of an object image) through a differentiation circuit or the like.

In shooting an ordinary object of shooting, if the lens is out of focus, the level of the high frequency component of the video signal is low and the width of blur is wide. The level of the high frequency component increases and the width of blur decreases accordingly as the lens comes closer to an in-focus state. The level and the width respectively reach a maximum value and a minimum value when the lens reaches a completely in-focus state.

The focusing lens is controlled to drive it at a highest possible-speed in the direction of increasing the sharpness if the sharpness is low and the driving speed is lowered accordingly as the sharpness increases in such a way as to bring the focusing lens to a stop just on the top of a hill-like curve representing the degrees of sharpness. This method of control is generally called a hill climbing automatic focusing method or a hill climbing AF method. The adoption of an automatic focusing device operating in accordance with this method has greatly enhanced the operability of an apparatus for taking moving images such as a video camera. This automatic focusing function has become indispensable to a video camera or the like.

FIG. 1 is a block diagram showing one example of the conventional automatic focus adjusting (focusing) device of the kind arranged to use a video signal in a video camera. The illustration includes lens groups 101, 102, 104 and 105. The lens groups 101 and 104 are fixed lens groups. The lens group 102 is arranged to perform a magnifying power varying action (hereinafter referred to as a variator lens). Reference numeral 103 denotes a diaphragm. The lens group 105 is arranged to perform a focus adjusting action and to compensate a focal plane obtained after the magnifying power varying action (hereinafter referred to as a focusing lens).

Reference numeral 106 denotes an image sensor. An AF control microcomputer 107 is arranged to control a whole system including lens driving control, AF control, etc. An aperture encoder 108 is arranged to detect the aperture value of the diaphragm 103. An amplifier 109 is arranged to amplify a signal outputted from the aperture encoder. A conversion circuit 110 is arranged to convert the signal of the aperture encoder 109 into a DC signal of a variable level. An A/D (analog-to-digital) converter 128 is arranged to A/D convert the output of the conversion circuit 110 into a digital signal and to supply the digital signal to the AF control microcomputer 107.

A buffer amplifier 111 is arranged to amplify or impedance-convert the output of the image sensor 106. A BPF 113 is arranged to take out a high frequency component of a video signal which is outputted from the image sensor 106, the high frequency component being arranged to be used for AF control. An AF signal processing circuit 114 is arranged to form from the high frequency component a sharpness signal which is to be used in carrying out the AF control. An A/D converter 115 is arranged to A/D convert the output of the AF signal processing circuit 114 into a digital signal and to supply the digital signal to the AF control microcomputer 107.

A variator lens driving motor 119 and a focusing lens driving motor 122 are respectively arranged to drive the variator lens 102 and the focusing lens 105. Racks 120 and 123 are connected to the variator lens 102 and the focusing lens 105, respectively, and constantly mesh with the rotation shafts of the variator lens driving motor 119 and the focusing lens driving motor 122. Drivers 121 and 124 are arranged to drive the variator lens driving motor 119 and the focusing lens driving motor 122 in accordance with instructions received from the AF control microcomputer 107. An integrator 125 is arranged to integrate a signal outputted from an AGC (automatic gain control) circuit 112. A diaphragm control circuit 126 is arranged to control the aperture of the diaphragm 103 in such a way as to give an adequate amount of exposure in reference to a signal outputted from the integrator 125. A driver 127 is arranged to drive the diaphragm 103. The output signal of the A/D converter 115 to be inputted to the AF control microcomputer 107 has a value which varies with the magnitude of the high frequency component of the video signal. The amount of the high frequency component becomes a maximum amount when the lens is perfectly in focus and becomes smaller when it is out of focus.

In the arrangement described above, the output signal of the A/D converter 115 is called a focus voltage or a focus signal. The AF control microcomputer 107 is arranged to cause the focusing lens 105 to be moved in such a way as to make the value of the output signal of the A/D converter 115 (the focus signal) to become a maximum value. Further, depending on the state of a zoom switch which is not shown, the AF control microcomputer 107 outputs and gives a driving instruction to the drivers 121 and 124 to move the variator lens 102 toward its telephoto end position or toward its wide-angle end position.

A focusing action is performed in the following manner. In the case of an automatic focusing device of the kind arranged to monitor the increase or decrease of the amount of the high frequency component (focus voltage) as in the case of the arrangement shown in FIG. 1, the focusing lens is moved to cause the amount of the high frequency component to become a maximum amount as mentioned above. The amount of the high frequency component increases or decreases in relation to the position of the focusing lens, for example, as represented by a curve 201 in FIG. 2. FIG. 7 is a flow chart showing in outline a flow of processes of the automatic focusing action. Referring to FIG. 7, the focusing action is described as follows. Assuming that the focusing lens has been in repose with an in-focus state obtained for an object of shooting, in cases where the object changes and the focusing lens is moved by driving it again to maximize the focus voltage (hereinafter, this process will be called "restarting the focusing lens"), the focusing action must be performed through the following processes.

(I) A check is made to find if the current position of the focusing lens deviates from an in-focus position (a step 706 of FIG. 7).

(II) If so, a check is made to find whether a position where the focus voltage becomes a maximum value is located closer to a nearest distance position or closer to an infinity distance position than the current position of the focusing lens (a step 701 of FIG. 7).

(III) The lens is moved toward the in-focus position in the hill-climbing manner and is brought to a stop at a point where the focus voltage comes to show its maximum value (steps 702 to 705 of FIG. 7).

The details of the process (I) are as follows.

Referring to the hill-like curve 201 of the focus voltage shown in FIG. 2, the hill of the focus voltage changes as represented by a curve 202 when the object of shooting moves. The amount of the focus signal obtained at the focusing lens position then changes by a value A as shown at a part 203 in FIG. 2.

A threshold level 204 is set for making a decision as to whether the focusing lens is to be restarted or not, as represented by a line 204 in FIG. 2. This threshold level 204 is determined according to a focus signal obtained when an in-focus state is last obtained. Assuming that the level of the last focus signal is X, the threshold level 204 can be expressed by the following formula.

$$A = X - X \times N/100 \quad (1)$$

In the formula (1) above, "N" represents a constant predetermined according to the position of the focusing lens and that of the variator lens. The larger the value of the constant N, the more hard the lens is to move.

FIG. 5 shows a relationship obtained among the object distance, the focusing and variator lens in a rear-focus type lens system having the focusing lens located rearwardly of the variator lens. The position of the variator lens (focal length) is shown on the axis of abscissa. The position of the focusing lens is shown on the axis of ordinate. As apparent from FIG. 5, in a case where the lens position is on the wide-angle side and the object of shooting is located in the neighborhood of an infinity distance, the amount of change taking place in the position of the focusing lens for a change taking place in the object distance is so small that an in-focus state might be attained without moving the focusing lens. The value of the constant N is, therefore, set at a larger value for positions on the wide-angle side and at a smaller value for positions on the telephoto side.

When the value of the focus signal changes to a great extent from the threshold level set in the above-stated manner, as indicated by a curve 205 in FIG. 2, it is decided to be necessary to restart the focusing lens, and the direction of driving is selected as described below;

Further, in deciding the restart, it is assumed that a panning operation or the like is quickly performed on the camera in a case where the focus voltage becomes much lower than the threshold level, as indicated by a curve 206 in FIG. 2. In such a case, the blurring time of the object image is minimized for adequate and smooth focusing by not making any check for an in-focus state during the process of selecting the direction of the restart.

Next, the process (II) of selecting the focusing lens driving direction is described as follows. FIG. 3 shows the position of the focusing lens in relation to changes taking place in the level of the focus signal.

Referring to FIG. 3, in a case where the focusing lens is located in a position 308 which is closer to an infinity distance position than an in-focus position, the focusing lens is moved along a locus 305 defined by points (1) to (15). This moving action is called wobbling. Then, since the focusing lens comes nearer and farther to and from the in-focus position, the focus voltage varies as represented by a curve 306 in FIG. 3. If the focusing lens is located in a position closer to the nearest distance position than the in-focus position, on the other hand, the wobbling action performed in the same manner as represented by the locus 305 causes the focus voltage to vary as represented by a curve 307. Comparison of the curves 306 and 307 shows a difference of 180 degrees in phase between the focus-voltage increasing and decreasing curves 306 and 307. In other words, in selecting the driving direction, the wobbling action is carried out in a predetermined manner and a discrimination can be made between a near-focus state and a far-focus state by making a check to find how the focus voltage comes to vary.

Further, a check can be made for an in-focus state by carrying out the wobbling action.

In FIG. 3, a curve 309 shows changes taking place in the focus voltage when the wobbling action is performed at an in-focus point. At the in-focus point, the focus signal shows inphase changes in response to deflections in either of the different directions. When the focus voltage is detected to vary as represented by the curve 309, therefore, the lens is decided to be in an in-focus state and is brought to a stop without performing the process of detecting the maximum value of the focus voltage in the manner as described below.

Next, the process (III) of detecting a point at which the focus voltage is at its maximum value is described as follows. The maximum value of the focus voltage greatly fluctuates according to the object of shooting or the conditions of shooting. Therefore, it is impossible to consider a value of the focus voltage to be the maximum value when any value of the focus voltage is obtained. Therefore, as shown in FIG. 4, while the focusing lens in on the move in the direction selected by the wobbling action, the focus voltage is constantly peak-held. The moving direction of the focusing lens is then reversed at a point of time when the focus voltage comes to change from an increasing state to a decreasing state. The lens is thus returned until the focus voltage becomes equal to the peak-held value before stopping it.

The automatic focusing (focus adjustment) is performed by carrying out control in this manner.

In some cases, while the focusing lens is in an in-focus state, a slight movement of the object of shooting comes to lower the focus voltage to such a small extent that cannot be determined to indicate a defocused state. In such a case, according to a known method, the focusing lens is slowly moved to a minute extent from its current position to reconfirm the in-focus state. This method makes it possible to reliably maintain an in-focus state even for a slow change taking place in the object.

Products on which zoom lenses of high magnifying power, such as 10 magnifications or 12 magnifications, are mounted thereon have increased in number. In the case of such a high magnifying power, shooting with the camera held by hand tends to result in an image shake. The image shake lowers the focus voltage and might accidentally cause a restart of the driving action on the focusing lens. In view of this problem, such cameras are generally provided with an image stabilizing mechanism.

However, the conventional device of the kind described above has had the following shortcomings or problems in carrying out a series of processes.

(i) When the focus signal is caused to vary by wobbling, a check is made to judge whether the top of the hill of the focus signal is located on the side of the nearest distance position or on the side of the infinity distance position. While the judgment can be accurately made in the neighborhood of an in-focus position, the focusing direction tends to be misjudged in the event of an extremely defocused state in which the focusing lens is located within a skirt area of the hill, for example, as shown in FIG. 6. In such a case, changes in the focus signal resulting from wobbling do not readily appear and the focusing direction is apt to be misjudged under the influence of a noise or the like. If the result of the wobbling action happens to be in error, the hill climbing control is executed by climbing up to the top of the hill of the focus signal in the wrong direction in search of an in-focus point. The search in the wrong direction makes the focusing time longer and might bring the focusing lens to a stop while the lens is still in a defocused state.

(ii) While a panning operation is in process, the object of shooting is virtually in a moving state. With panning performed at an adequate speed, the degree of fluctuations taking place in a video signal variously changes. If the wobbling action is performed under such a condition, it is hardly possible to accurately determine the change of the focus signal to be a real change or a spurious change resulting from the moving state of the object of shooting. In such a case, a misjudgment is apt to be made due to a noise.

(iii) In detecting a quick panning operation mentioned above and in carrying out control after the detection, if the quick panning operation is performed for two different objects of shooting located at the same distance from the camera, for example, a drop in the focus voltage taking place during the process of panning would cause the focusing lens to be accidentally driven even when the camera is brought to a stop at the end of the panning in a state of being directed to one of the objects for which the focusing lens does not have to be moved. Such panning gives an unstable impression.

(iv) In the case of the rear-focus type lens (FIG. 5), if the wobbling action is performed for an object of shooting located at such a part for which the position of the focusing lens is on the side of the infinity distance position with the variator lens in a wide-angle position, a relation between the number of focusing lens driving pulses and the object distance inevitably causes the wobbling action to show up too much when deflection is effected to an amplitude by which the focus adjusting direction can be decided.

SUMMARY OF THE INVENTION

This invention is directed to the solution of the problems mentioned in the foregoing. It is, therefore, a first object of this invention to provide an automatic focus adjusting (focusing) device which is capable of always quickly and accurately performing focus control irrespective of the current state of focus.

It is a second object of this invention to provide an automatic focus adjusting device which is capable of accurately deciding the direction of focus adjustment irrespective of the state of focus and that of the object of shooting.

It is a third object of this invention to provide an automatic focus adjusting device which is capable of accurately detecting the state of focus without being affected by an operation on the camera such as panning, a noise and so on.

It is a fourth object of this invention to provide an automatic focus adjusting device which is arranged to optimize the timing of deciding the focus adjusting direction.

To attain the objects mentioned above, an automatic focus adjusting device arranged according to this invention as a preferred embodiment thereof includes extracting means for extracting a focus signal corresponding to a degree of focus from a picked-up image signal outputted from image pickup means, a focusing lens to be used for focus adjustment, and direction deciding means for deciding a driving direction of the focusing lens on the basis of the focus signal outputted from the extracting means when the focusing lens deviates from an in-focus state. The extracting means is arranged to extract a plurality of focus signals having different frequency components. The direction deciding means is arranged to separately compute the driving direction of the focusing lens relative to each of the plurality of focus signals and to decide the driving direction of the focusing lens when results of the computation coincide with each other.

It is a fifth object of this invention to provide an automatic focus adjusting device which is capable of controlling a length of time required before performing a direction deciding action while monitoring changes taking place in a focus signal and is thus arranged to be capable of accurately and stably deciding the focus adjusting direction without any error.

To attain the fifth object, an automatic focus adjusting device arranged as a preferred embodiment of this invention includes extracting means for extracting a focus signal corresponding to a degree of focus from a picked-up image signal outputted from image pickup means, storing means for storing the focus signal extracted by the extracting means, a focusing lens to be used for focus adjustment, direction deciding means for deciding a driving direction of the focusing lens on the basis of the focus signal outputted from the extracting means when the focusing lens deviates from an in-focus state, detecting means arranged to compare the level of the focus signal stored in the storing means with the level of the focus signal extracted by the extracting means and to detect a difference between the levels of the focus signals, monitoring means for monitoring a temporal change of the difference between the focus signals detected by the detecting means, and control means for causing the direction deciding means to decide the driving direction of the focusing lens either after an amount of change of the focus signal is determined to be small by the monitoring means or after the level of the focus signal extracted by the extracting means is determined to exceed a predetermined value.

It is a sixth object of this invention to provide an automatic focus adjusting device which is arranged to detect any excessive drop in level of a focus signal resulting from quick panning or the like before and after a focusing direction deciding action and to perform a process of detecting changes taking place in the focus signal after the level of the focus signal has increased from the excessively dropped level up to a certain level, so that an automatic focus adjusting action can be stably and accurately carried out without being affected by a disturbance such as panning or the like.

To attain the sixth object, an automatic focus adjusting device arranged as a preferred embodiment of this invention includes extracting means for extracting a focus signal corresponding to a degree of focus from a picked-up image signal outputted from image pickup means, storing means for storing the focus signal extracted by the extracting means, a focusing lens to be used for focus adjustment, direction deciding means for deciding a driving direction of the focusing lens on the basis of the focus signal outputted from the extracting means when the focusing lens deviates from an in-focus state, detecting means arranged to compare the level of the focus signal stored in the storing means with the level of the focus signal extracted by the extracting means and to detect a difference between the levels of the focus signals, in-focus state deciding means for deciding an in-focus state on the basis of the focus signal extracted by the extracting means, and control means for controlling an action of the direction deciding means according to a temporal change of the difference between the focus signals detected by the detecting means when the focusing lens deviates from an in-focus state.

It is a seventh object of this invention to provide an automatic focus adjusting device which is arranged to vary a method for deciding the focus adjusting direction according to the amount of change of a focus signal, the position of a focusing lens and the position of a variator lens, so that an automatic focus adjusting action can be stably and accurately carried out irrespective of the state of a zooming action.

To attain the seventh object, an automatic focus adjusting device arranged as a preferred embodiment of this invention includes extracting means for extracting a focus signal corresponding to a degree of focus from a picked-up image signal outputted from image pickup means, storing means for storing the focus signal extracted by the extracting means, a focusing lens to be used for focus adjustment, first direction deciding means for deciding a driving direction of the focusing lens on the basis of the focus signal outputted from the extracting means when the focusing lens deviates from an in-focus state, second direction deciding means, arranged separately from the first direction deciding means, for deciding the driving direction of the focusing lens on the basis of the focus signal extracted by the extracting means, focusing lens position detecting means for detecting the position of the focusing lens, variator lens position detecting means for detecting the position of a variator lens, and control means arranged to decide the driving direction of the focusing lens by selecting either the first direction deciding means or the second direction deciding means according to the focus signal extracted by the extracting means, an output of the focusing lens position detecting means and an output of the variator lens position detecting means.

It is an eighth object of this invention to provide an automatic focus adjusting device which is arranged to control a length of time required before performing an action of deciding the direction of focus adjustment from a defocused state according to information obtained from an external device, such as an image stabilizing device, so that the direction deciding action can be always stably and accurately accomplished.

To attain the eighth object, an automatic focus adjusting device arranged according to this invention as a preferred embodiment thereof includes extracting means for extracting a focus signal corresponding to a degree of focus from a picked-up image signal outputted from image pickup means, storing means for storing the focus signal extracted by the extracting means, a focusing lens to be used for focus adjustment, direction deciding means for deciding a driving direction of the focusing lens on the basis of the focus signal outputted from the extracting means when the focusing lens deviates from an in-focus state, and control means for varying the timing of commencement of an action of the direction deciding means on the basis of predetermined information supplied from outside.

The automatic focus adjusting device is arranged to decide the focus adjusting direction first on the basis of each of a plurality of different frequency signals and, after that, to finally decide the direction according to the results of the preliminary direction deciding action, so that the direction deciding action can be reliably and accurately accomplished.

These and other objects and features of this invention will become apparent from the following detailed description of embodiments thereof taken in connection with the accompanying drawings.

BRIEF DESCRIPTION OF THE DRAWINGS

FIG. 15 shows changes taking place in an image shake signal with an image stabilizing mechanism used for the fifth embodiment of this invention.

FIG. 16 is a block diagram showing the arrangement of an automatic focus adjusting device arranged as a sixth embodiment of this invention.

FIG. 17 is a flow chart showing the operation of the sixth embodiment of this invention.

FIGS. 18(a), 18(b) and 18(c) show the arrangement and operation of a seventh embodiment of this invention.

DETAILED DESCRIPTION OF THE PREFERRED EMBODIMENTS

The following describes the details of this invention through the preferred embodiments thereof with reference to the accompanying drawings.

Figure 1:
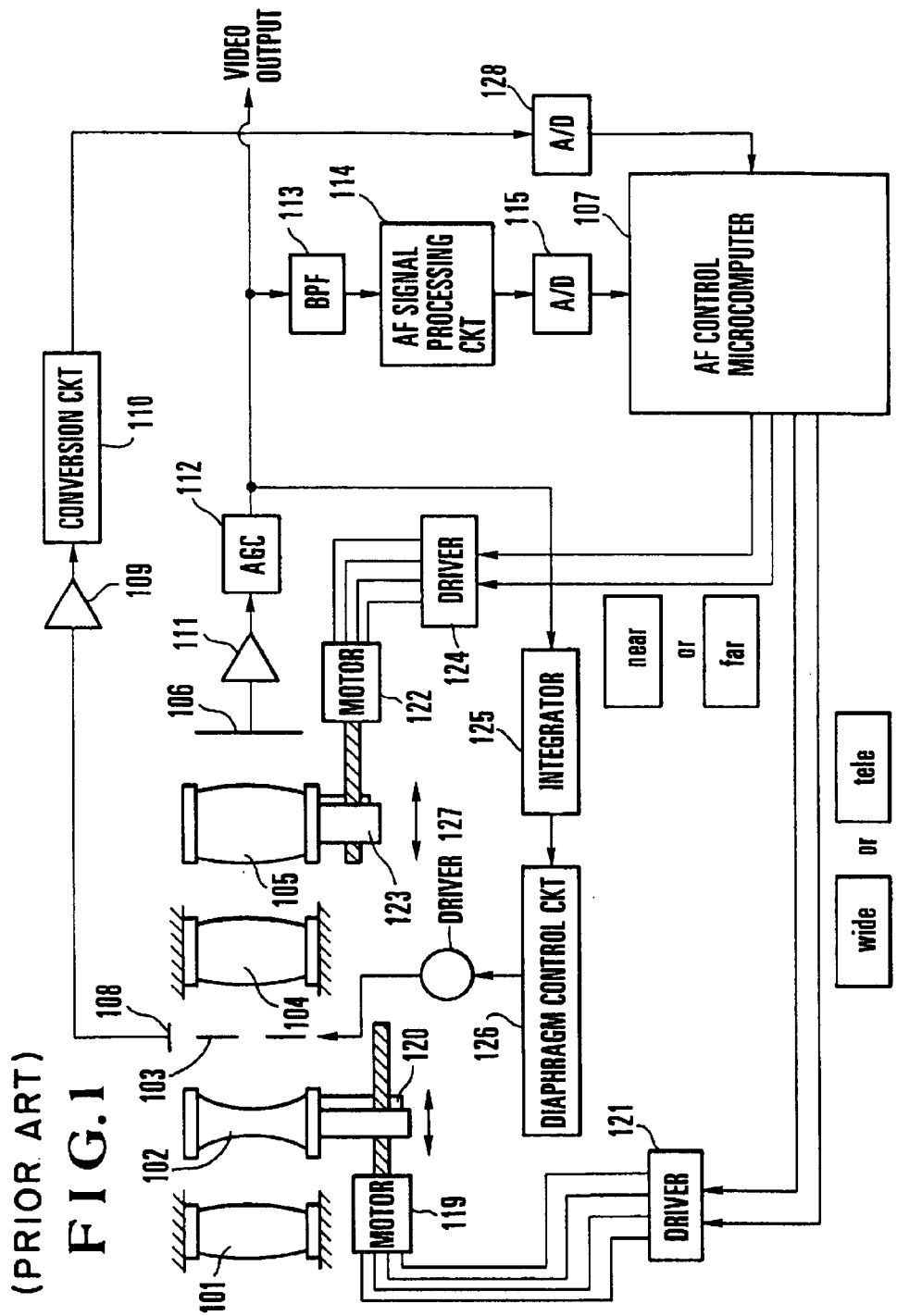
FIG. 1 is a block diagram showing the arrangement of an automatic focus adjusting device of the kind using a video signal.
Figure 8:
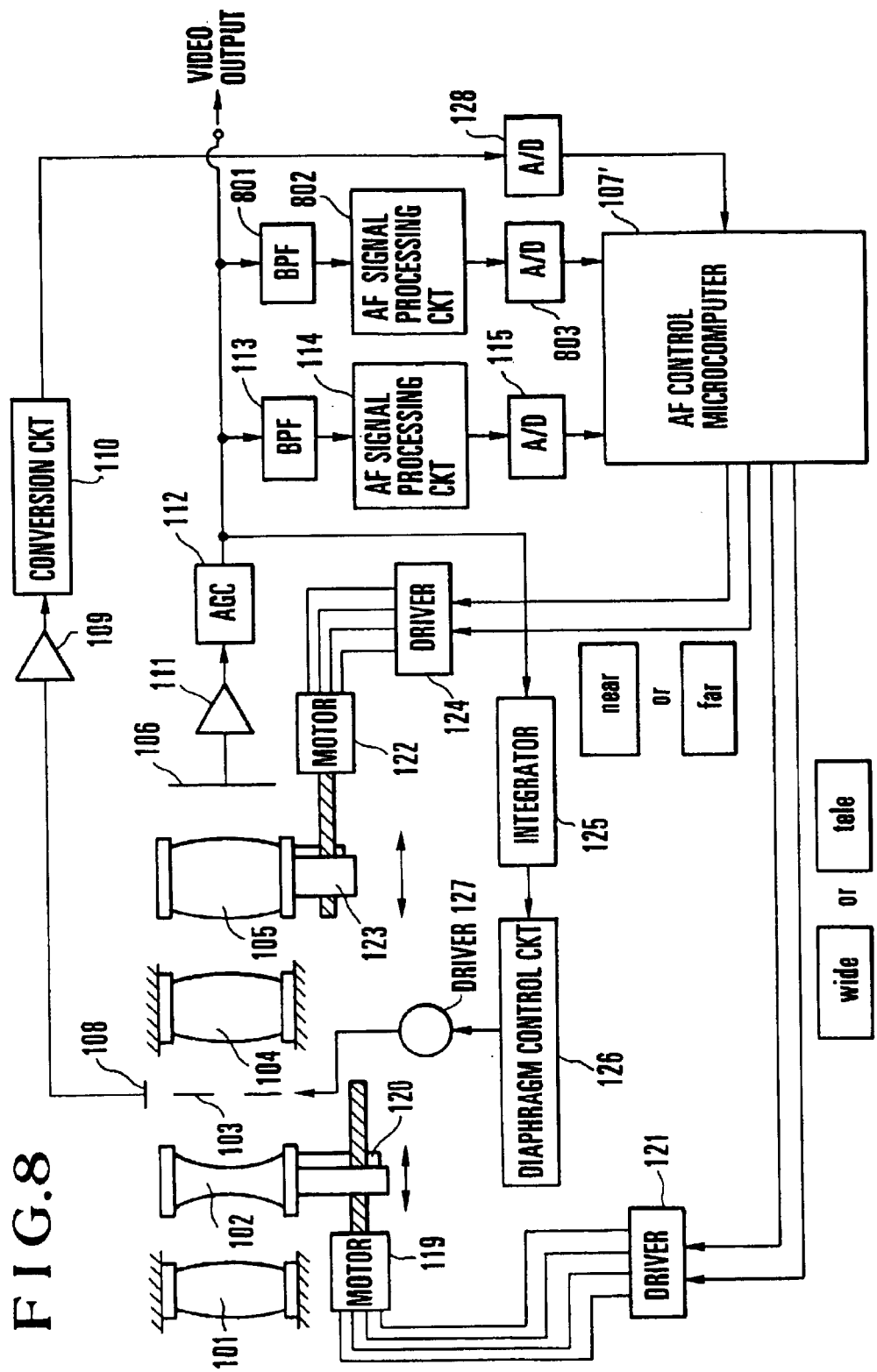
FIG. 8 is a block diagram showing the arrangement of an automatic focus adjusting device arranged according to this invention.

FIG. 8 is a block diagram showing the circuit arrangement of an automatic focus adjusting device arranged according to this invention. In FIG. 8, all the parts that are arranged in the same manner as those of FIG. 1 are indicated by the same reference numerals and the details of them are omitted from description.

This embodiment differs from the arrangement of the conventional device shown in FIG. 1 in that the embodiment includes some additional elements arranged as follows. A BPF (band-pass filter) 801 having a lower frequency passband than the BPF 113 is arranged to extract a frequency component which differs from the frequency component to be extracted by the BPF 113 from a video signal outputted from the AGC circuit 112. An AF signal processing circuit 802 is arranged to form a sharpness signal to be used for an AF process from the predetermined high frequency component signal output of the BPF 801. An A/D converter 803 is arranged to convert the output signal of the AF signal processing circuit 802 into a digital signal and to supply the digital signal to an AF control microcomputer 107'. The AF control microcomputer 107' is provided with an AF processing program which differs from the program provided in the AF control microcomputer 107 of the conventional device shown in FIG. 1.

The AF control operation to be performed by the AF control microcomputer 107' according to this invention is described step by step as follows.

Figure 9:
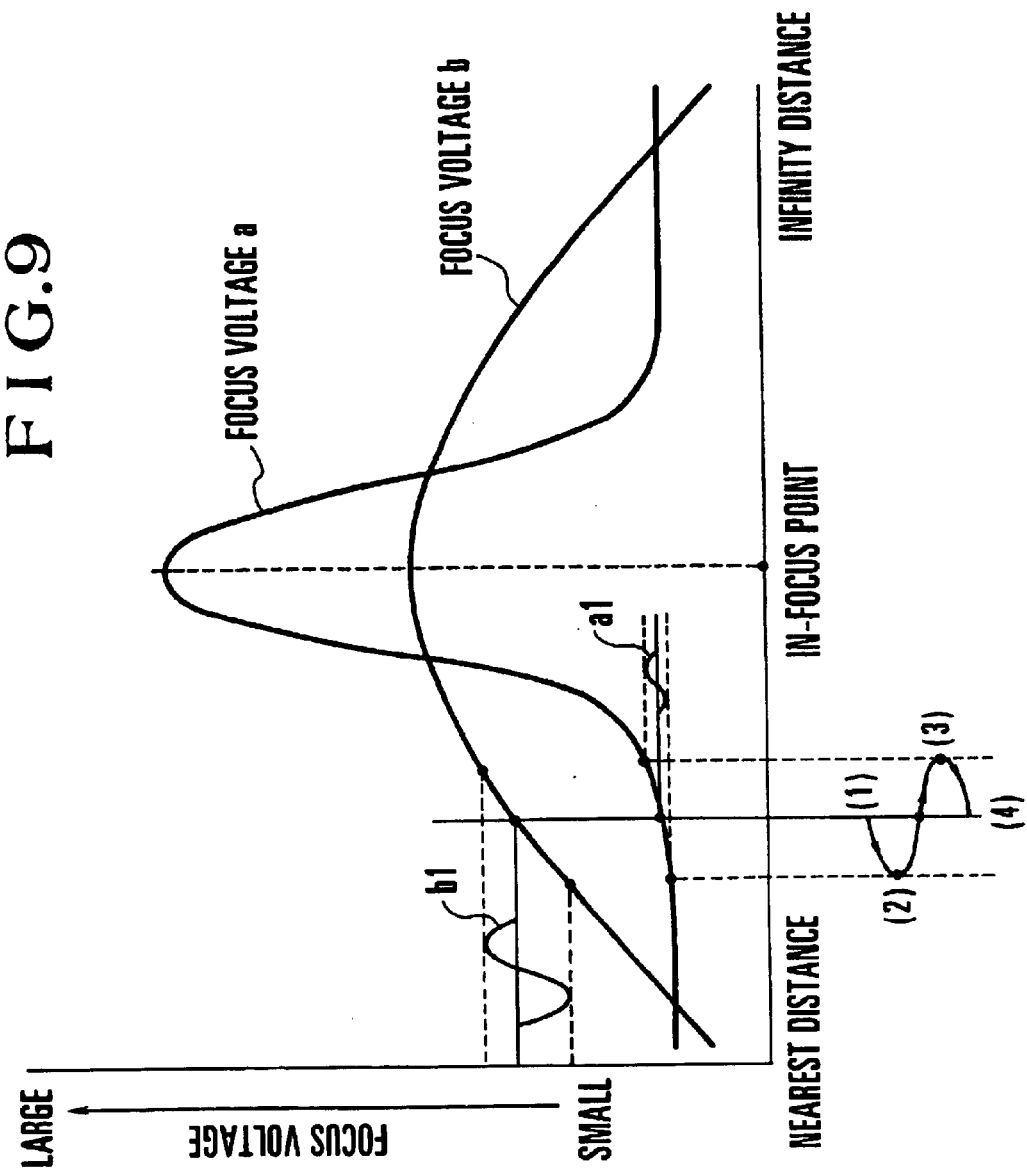
FIG. 9 is a characteristic diagram of a focus signal showing the operation of the automatic focus adjusting device arranged according to this invention.

FIG. 9 shows the output signals, i.e., focus voltages, of the BPF 113 and the BPF 801 in relation to the position of the focusing lens 105.

The BPF 113 has a higher frequency passband than the BPF 801 and has a characteristic (focus voltage) "a" which presents a steeper "hill-like" curve than the BPF 801 with an in-focus point in the middle of the hill-like curve. The output of the BPF 801 which has a lower passband and thus has a characteristic (focus voltage) "b" which presents a moderate "hill-like" curve with the in-focus point in the middle of the hill. These characteristic curves in comparison are of course obtained for the same object of shooting.

When wobbling is performed by driving the focusing lens from one point to another as indicated by points (1), (2), (3) and (4) in FIG. 9, the output signal levels of the BPFs 113 and 801 vary as represented by curves a1 and b1 in FIG. 9. The changes of the signal levels a1 and b1 are received by the AF control microcomputer 107'. The phases of the signal level changes are checked to find and decide whether the in-focus point is located on the side of the nearest distance position or on the side of the infinity distance position. The direction in which the focusing lens 105 is to be driven is decided according to the result of the check. The algorithm of this direction deciding operation is described below with reference to FIG. 10 which is a flow chart.

Figure 10:
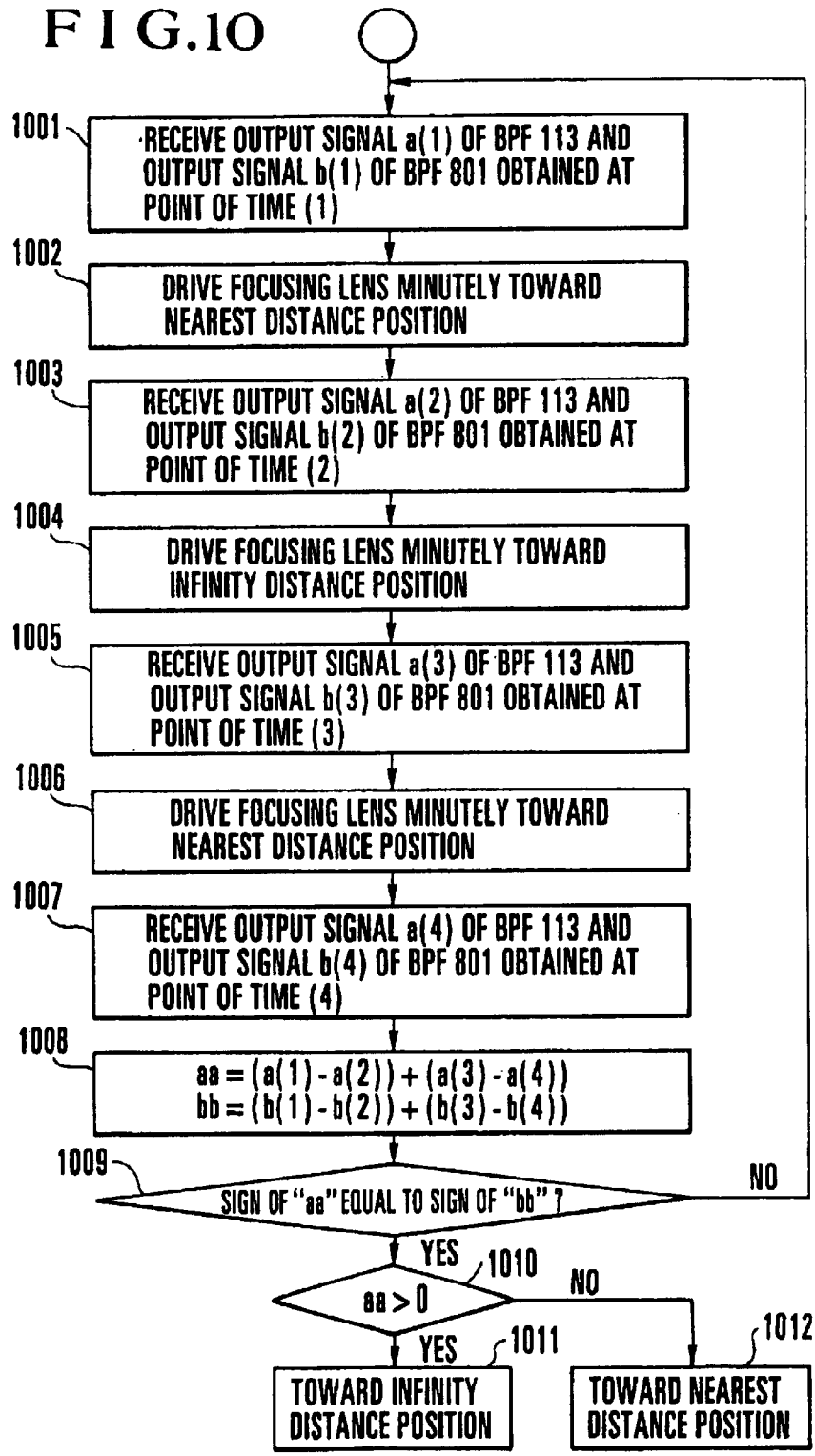
FIG. 10 is a flow chart showing the operation of a first embodiment of this invention.

At a step 1001 after commencement of the flow of processes as shown in FIG. 10, the output signal level a(1) of the BPF 113 and the output signal level b(1) of the BPF 801 obtained at the point of time (1) of FIG. 9 are received by the AF control microcomputer 1071. At a step 1002, the focusing lens 105 is driven to minutely move toward its nearest distance position. At a step 1003, the output signal level a(2) of the BPF 113 and the output signal level b(2) of the BPF 801 obtained at the point of time (2) of FIG. 9 are received.

At a step 1004, the focusing lens 105 is driven to minutely move toward its infinity distance position. At a step 1005, the output signal level a(3) of the BPF 113 and the output signal level b(3) of the BPF 801 obtained at the point of time (3) of FIG. 9 are received.

The flow then comes to a step 1006. At the step 1006, the focusing lens 105 is moved to its initial position by driving it to minutely move toward its nearest distance position. At a step 1007, the output signal level a(4) of the BPF 113 and the output signal level b(4) obtained at the point of time (4) of FIG. 9 are received.

At a step 1008, the direction in which the focusing lens 105 is to be driven is decided from the output signal levels of the BPFs 113 and 801 obtained at the points of time (1) to (4) shown in FIG. 9. In other words, which of the signal level obtained by moving the focusing lens 105 from its initial position toward the nearest distance position and the signal level obtained by moving the focusing lens 105 toward the infinity distance position is higher is found through a computing operation. Generally, the in-focus point is judged to be located in the direction in which the output signal level of each of the BPFs 113 and 801 increases.

More specifically, the computing operation is performed for each of the BPFs 113 and 801. The decision relative to the output signal level "a" of the BPF 113 is made by carrying out a computing operation according to the following formula:

$$aa=(a(1)-a(2))+(a(3)-a(4))$$

The decision relative to the output signal level "b" of the other BPF 801 is made by carrying out a computing operation according to the following formula:

$$bb=(b(1)-b(2))+(b(3)-b(4))$$

It is considered that the in-focus point is located in the direction of the infinity distance position if both the result of decision "aa" relative to the output signal level "a" of the BPF 113 and the result of decision "bb" relative to the output signal level "b" are positive and in the direction of the nearest distance position if both the results of decision "aa" and "bb" are negative.

At a step 1009, a check is made to find if both the results of decision "aa" and "bb" are of the same sign of positive or negative. If so, the results of decision made by wobbling are considered to be reliable and the flow comes to a step 1010 to make a check to find if the value "aa" is positive. If so, the flow comes to a step 1011 to cause the focusing lens 105 to be driven toward the infinity distance position. If the value "aa" is negative, the flow comes to a step 1012 to cause the focusing lens 105 to be driven toward the nearest distance position in such a manner as to carry out the hill-climbing control action.

If the values "aa" and "bb" are found to be not both positive or to be not both negative at the step 1009, the decision made by wobbling is considered to have been not correctly carried out and the flow comes back to the step 1001 to again examine the changes taking place in the level of the focus signal by carrying out wobbling in the order of the points (1) to (4).

The embodiment is thus arranged to repeat the wobbling action, if the result of the wobbling action for the output signal level of the BPF 113 which has a high frequency passband and that of the wobbling action for the output signal level of the BPF 801 which has a lower frequency passband than the BPF 113 fail to coincide with each other. This arrangement thus enables the embodiment to detect the true focusing direction without being affected by any noise, any disturbance or the like, so that a period of time required before an in-focus point is attained from a blurred state can be shortened.

While the embodiment described above is arranged to use the focus signal voltages obtained from the two BPFs of different passpands, the use of a greater number of such BPFs would further enhance the reliability of the result of the direction deciding action.

Figure 11:
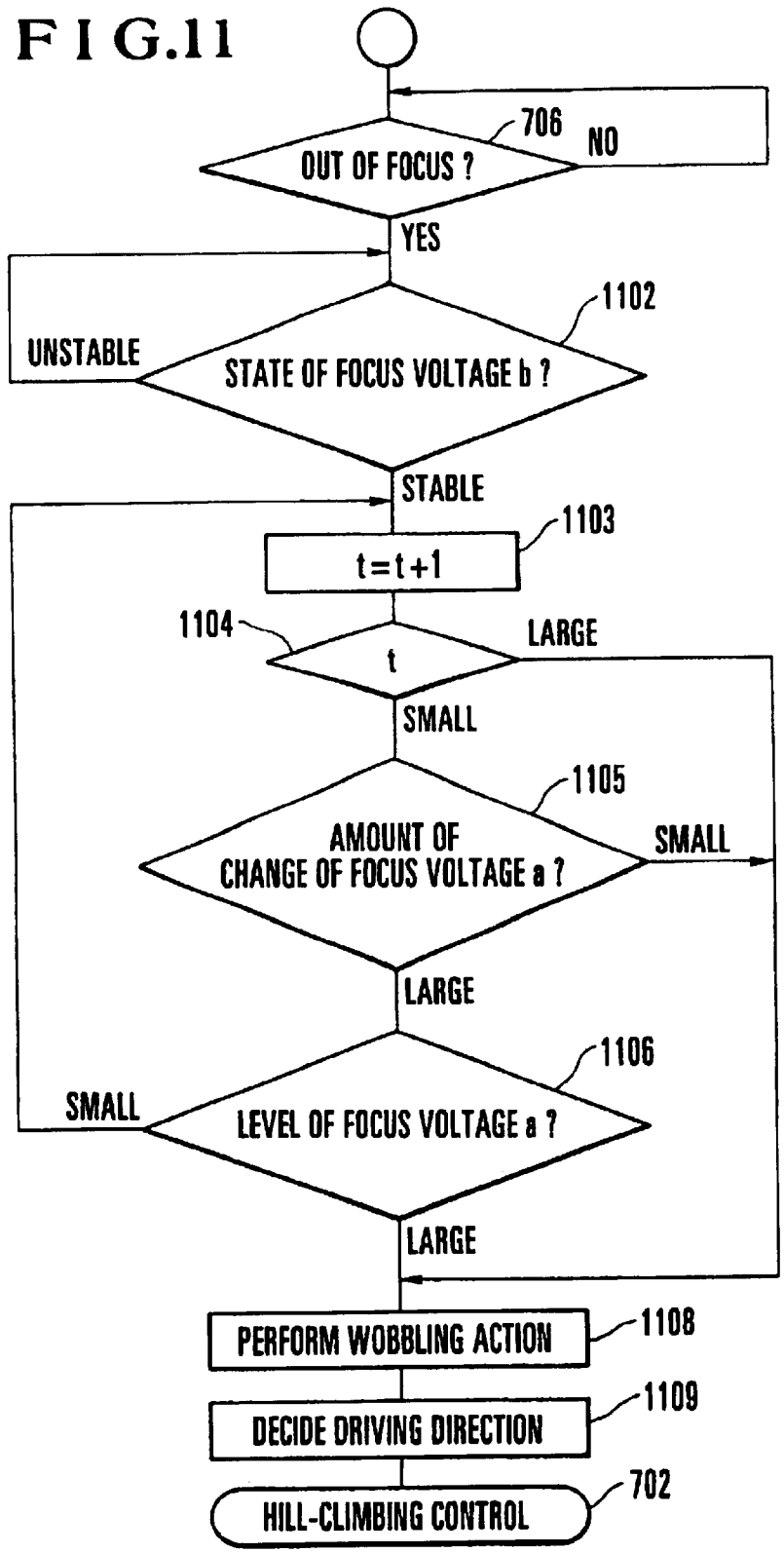
FIG. 11 is a flow chart showing the operation of a second embodiment of this invention.

A second embodiment of this invention relates to the timing of commencement of wobbling. The circuit arrangement of the second embodiment is similar to the arrangement shown in FIG. 8. FIG. 11 is a flow chart showing a flow of processes to be executed before the wobbling action begins for deciding the focusing lens driving direction after detection of a defocused state.

Figure 7:
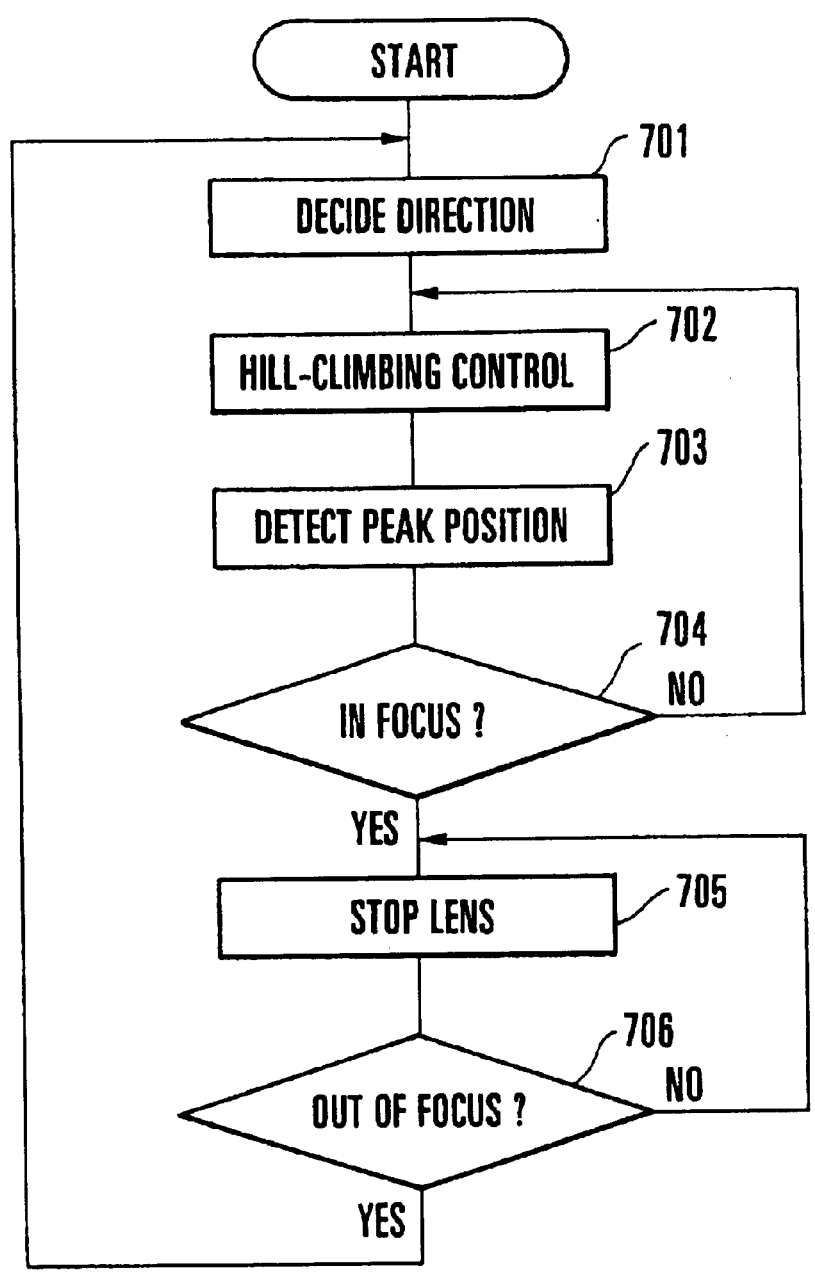
FIG. 7 is a flow chart showing the basic algorithm of an automatic focus adjusting operation.

In FIG. 11, the processes to be executed at steps 706 and 702 correspond respectively to the steps 706 and 702 of FIG. 7. If the lens is judged to be out of focus (or defocused) at the step 706, the flow comes to a step 1102. At the step 1102, the focus voltage "b" which is the output of the BPF 801 and is as shown in FIG. 9 is checked to find if it is stable. For this purpose, a difference between values of focus voltage "b" obtained through several vertical synchronizing periods is examined. As apparent from FIG. 9, the focus voltage "b" is more stable than the focus voltage "a" of the BPF 113. Therefore, an unstable state of the focus voltage "b" most likely indicates either that the object of shooting is greatly changing or that the camera is under a panning operation. In such a case, therefore, the flow is held in abeyance without executing the process of deciding the focusing direction, until the state of the focus voltage becomes stable. Upon stabilization of the focus voltage "b", the flow comes to a step 1103. Steps 1103 to 1106 are provided for a process of setting a waiting time according to the state of the focus voltage "a". This process consists of three parts including a step of shifting the flow to a next process if the waiting time comes to exceed a predetermined period of time (step 1104), a step of shifting the flow to a next process if the amount of change of the focal voltage "a" taking place within the several vertical synchronizing periods is small (step 1105), and a step of shifting the flow to a next process if the level of the focus voltage "a" is large (step 1106). At the step 1104, a limit is set to the waiting time, because, an excessively long waiting time brings about a state similar to a blurred state. At the step 1105, the changing amount of focus voltage "a" is checked for its stability. At the step 1106, the flow shifts to a next process if the level of the focus voltage "a" is high, because, as apparent from FIG. 9, a position where the focus voltage "a" is high can be considered to indicate that the focusing lens position is near to the in-focus point.

At a step 1108, a wobbling action is performed for deciding the direction of focus adjustment, i.e., the focusing lens driving direction. After the wobbling action, the flow comes to a step 1109. At the step 1109, the focusing lens driving direction is decided. The flow then shifts to a step 702 of the hill-climbing control. With the flow of operation arranged to wait for the stabilization of the focus voltage before the wobbling action and to decide the focusing lens driving direction in this manner, the direction deciding process by wobbling can be prevented from being misled by the unstable state of the focus signal caused by panning or the like.

Figure 2:
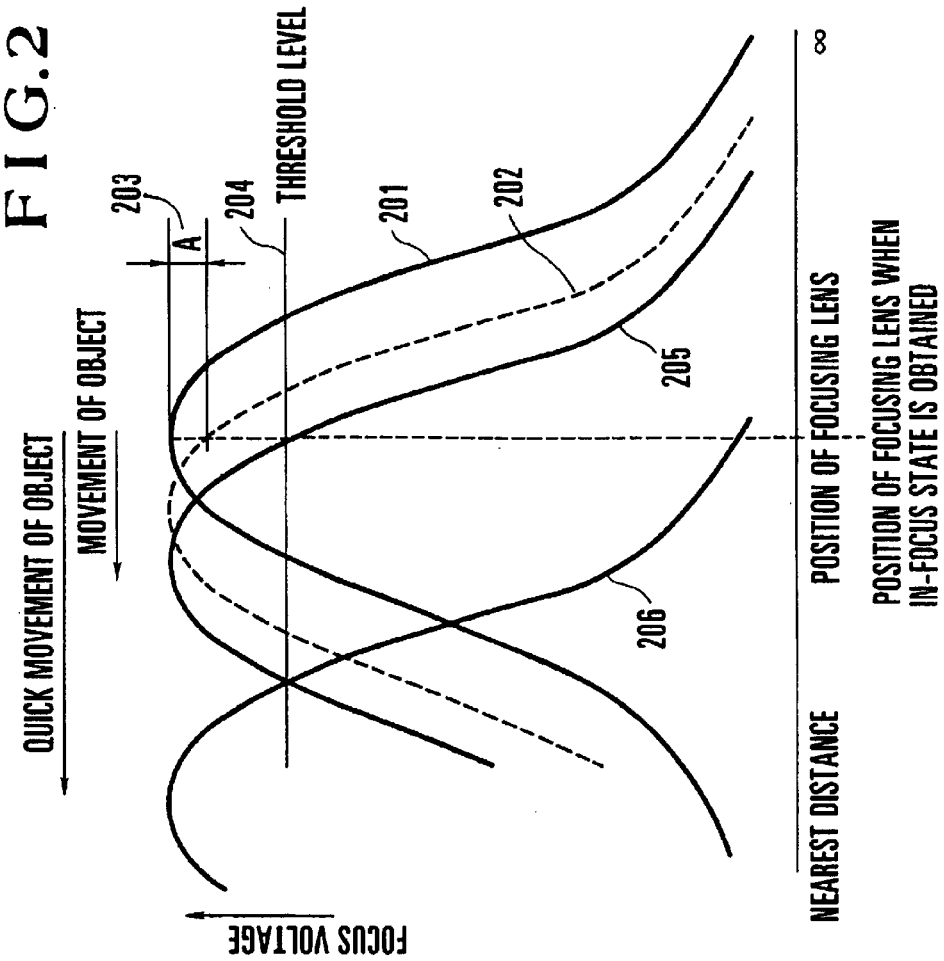
FIG. 2 is a characteristic diagram showing changes taking place in the level of a focus signal when the focusing lens moves.
Figure 3:
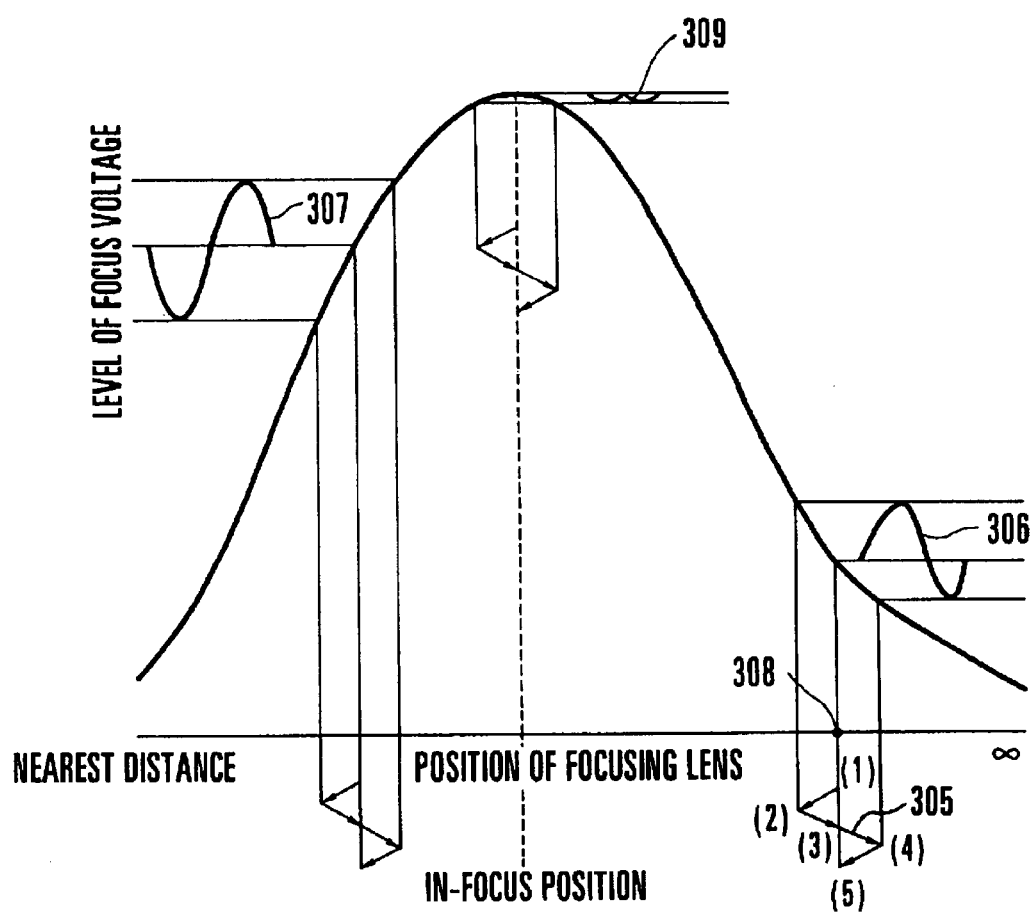
FIG. 3 shows a wobbling action.
Figure 4:
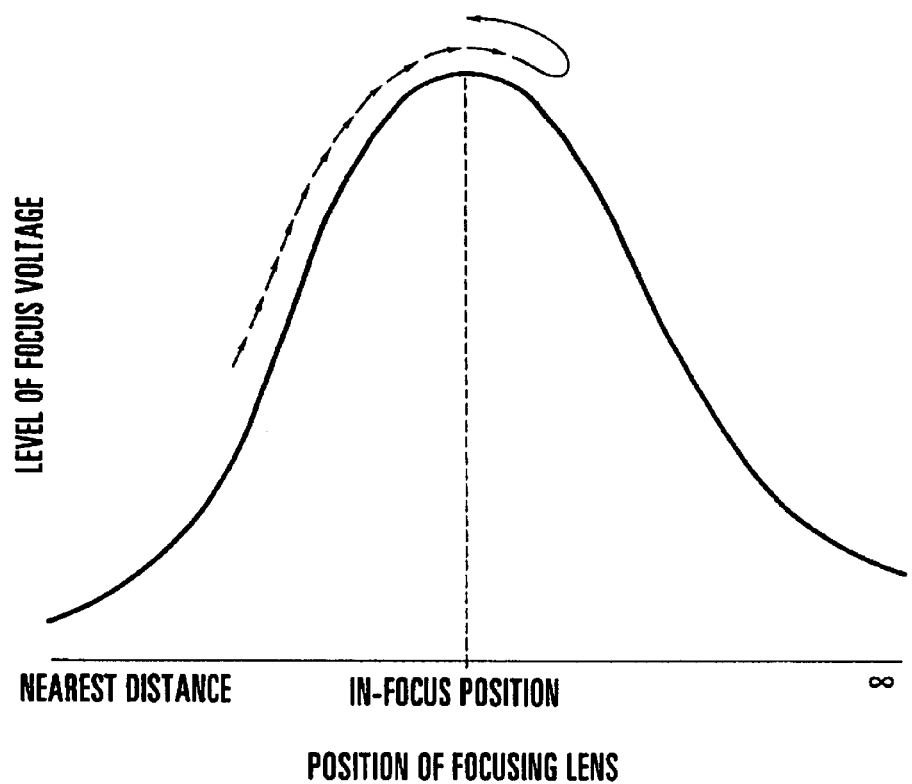
FIG. 4 is a characteristic diagram showing how a focusing action is performed.
Figure 12:
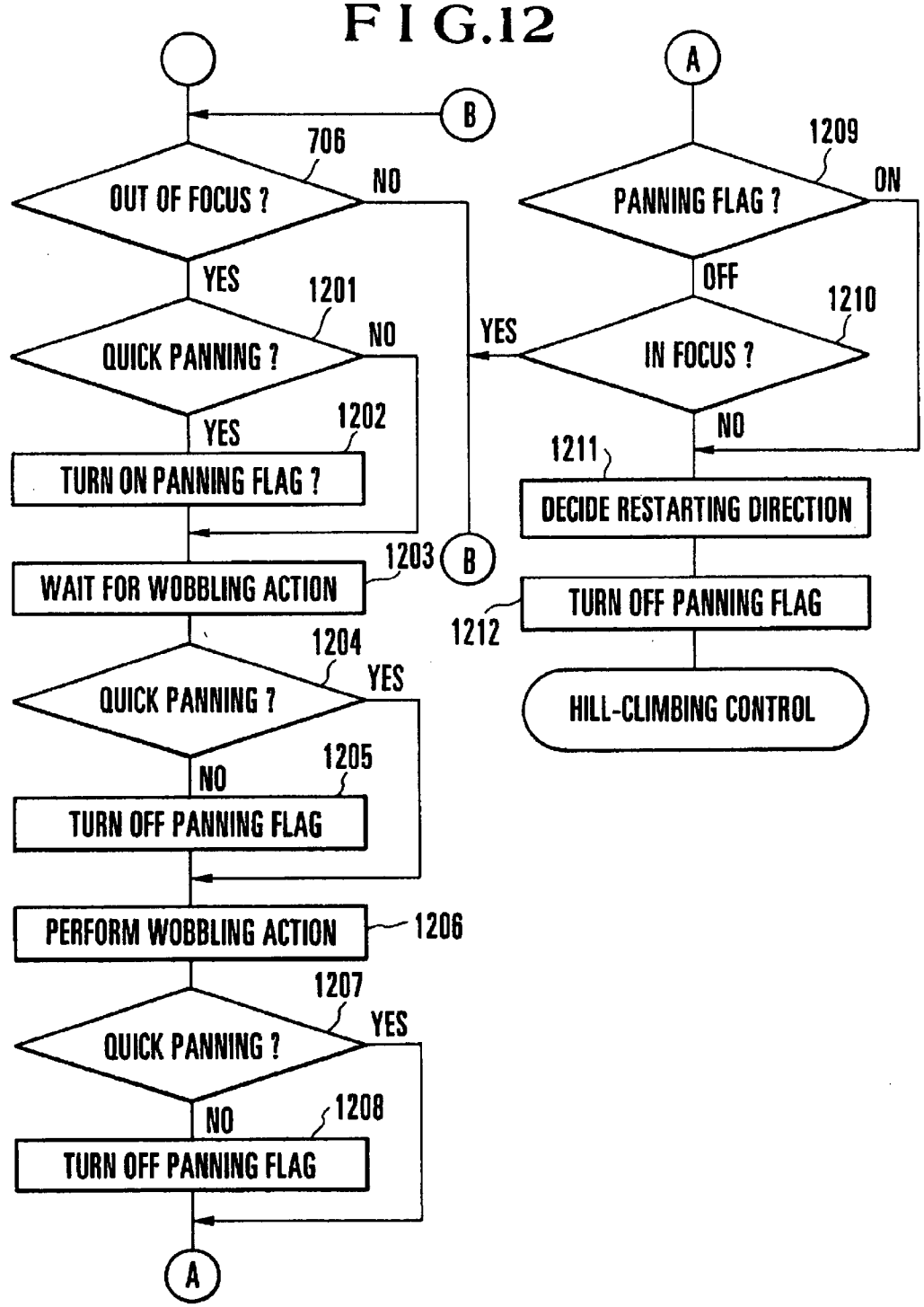
FIG. 12 is a flow chart showing the operation of a third embodiment of this invention.

FIG. 12 is a flow chart showing the flow of operation of a third embodiment of this invention. The third embodiment is described in detail with reference to FIG. 12 as follows. In FIG. 12, a step 706 is the same process of making a check for an out-of-focus (defocused) state as the step 706 of the flow chart of FIG. 7. If the lens is found to be in a defocused state at the step 706, the flow proceeds to a step 1201. At the step 1201, the level of the focus voltage is checked to find if the defocused state is caused by quick panning. If the focus voltage level is found to have greatly dropped from the level of voltage obtained at the time of an in-focus state as indicated by the curve 206 of FIG. 2, the defocused state is judged to have been caused by quick panning and the flow comes to a step 1202. At the step 1202, a flag which indicates detection of quick panning thereinafter referred to as a panning flag) is set. At a next step 1203, the flow waits for a wobbling action in the same manner as the wobbling-action waiting time of the second embodiment shown in FIG. 11. At a step 1204, again a check is made for quick panning. However, unlike the check made for quick panning at the steps 1201 and 1202, the check is made at the step 1204 also for a state of not having quick panning. The check for quick panning is decided, in the same manner as the step 1201, by the value of a difference between the previous focus voltage obtained when an in-focus state was obtained and the current focus voltage.

If the state of focus is found to be not indicating quick panning at the step 1204, the flow comes to a step 1205 to clear the panning flag which indicates detection of quick panning. At a step 1206, a wobbling action is performed for deciding the focusing lens driving direction. Upon completion of the wobbling action, the flow comes to a step 1207. At the step 1207, a check is made again for quick panning. The method of making this check is the same as the step 1201. If the result of check does not indicate quick panning, the flow comes to a step 1208 to clear the panning flag. At a step 1209, a check is made to find if the panning flag is in an on-state at present. If not, the flow comes to a step 1210. At the step 1210, a check is made to find if an in-focus state is obtained. If so, the flow comes back to the step 706. If the state of focus is again decided to be not an in-focus state at the step 1210 or if the panning flag is found to be in its on-state at the step 1209, the flow comes to a step 1211. At the step 1211, the driving direction is decided according to the result of wobbling. At a step 1212, the panning flag is cleared and the flow shifts to the process of hill-climbing control. Further, since a certain length of time has already elapsed after the check made for quick panning at the step 1201, in cases where panning is performed for objects located at the same distance at the steps 1204 and 1207, the probability of having the objects in focus is high. In view of this probability, the check is made again for quick panning to confirm whether or not the quick panning is really performed, so that the focusing lens can be prevented from being inadvertently driven.

As described above, the check for quick panning is made several times after the state of focus is decided to be out of focus and before the focusing lens is actually driven in the focusing lens driving direction decided. This arrangement enables the third embodiment to prevent the unstableness of images resulting from any erroneous result of the check made for quick panning.

Figure 13:
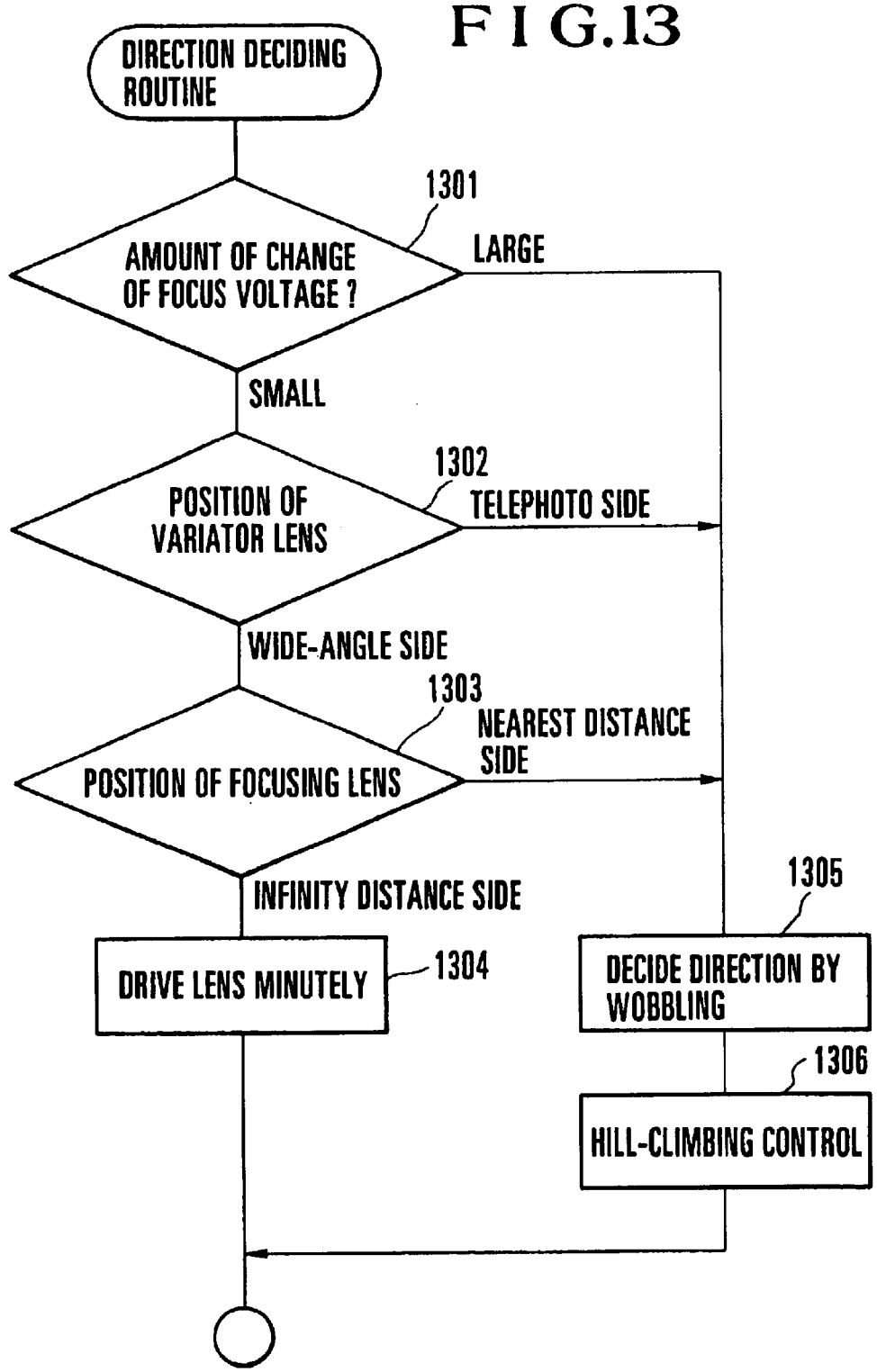
FIG. 13 is a flow chart showing the operation of a fourth embodiment of this invention.

FIG. 13 is a flow chart related to the operation of a fourth embodiment of this invention. The flow chart of FIG. 13 shows a method for varying a means for deciding the focusing lens driving direction according to the position of the focusing lens. Referring to FIG. 13, at a step 1301, a difference between a focus voltage obtained in an in-focus state and a focus voltage obtained in a defocused state is checked. If the difference is found to be small, the flow comes to a step 1302. At the step 1302, a check is made for the position of the variator lens. At a step 1303, a check is made for the position of the focusing lens.

Figure 5:
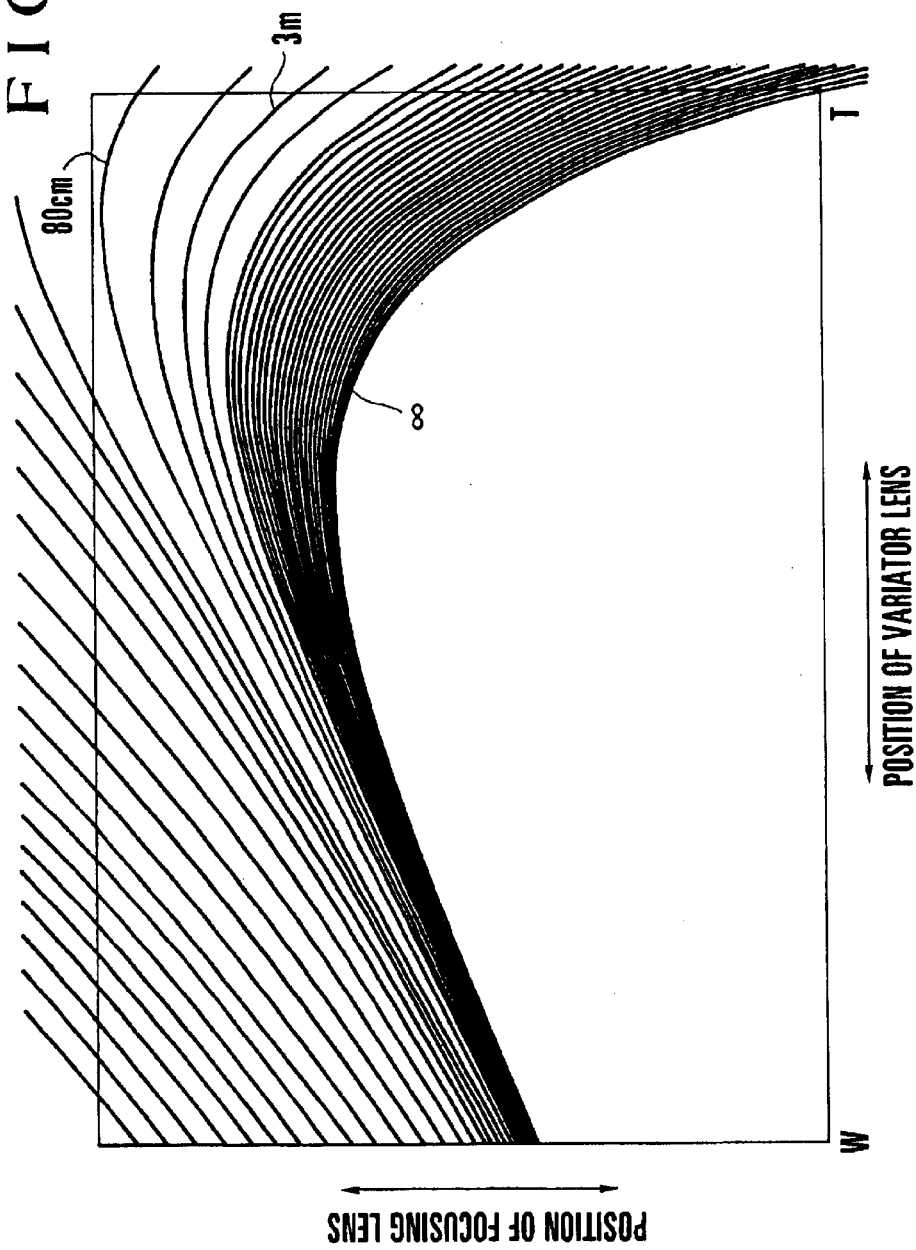
FIG. 5 is a graph showing the changes of a focal plane resulting from the movement of a variator lens in a rear-focus type lens system with object distance used as a parameter.
Figure 6:
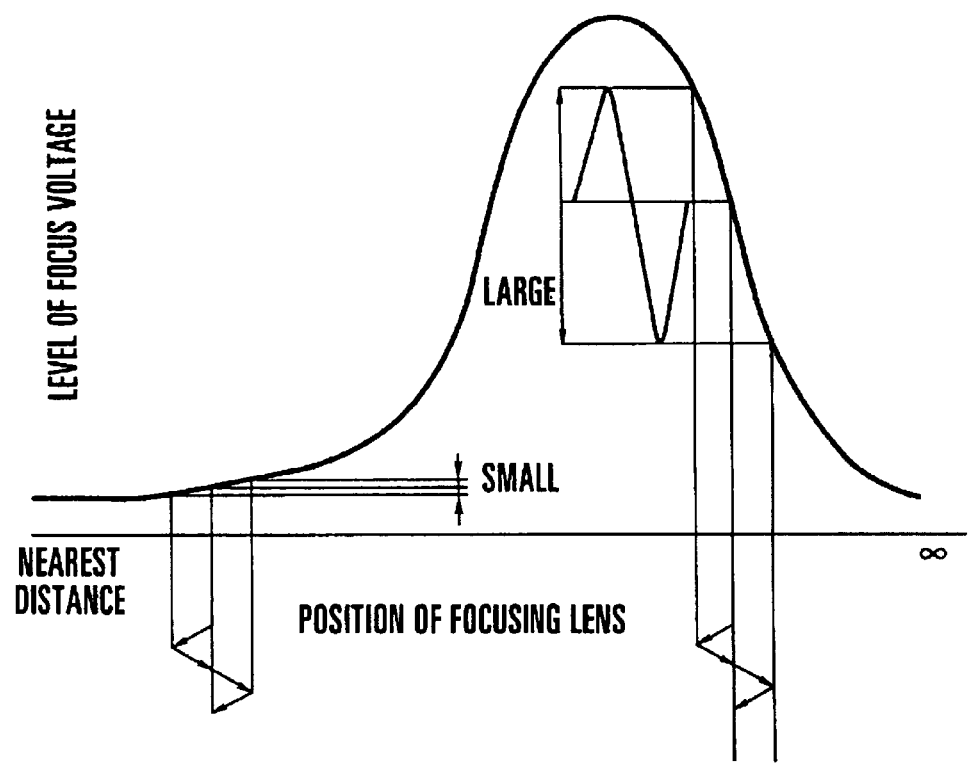
FIG. 6 is a characteristic diagram showing changes taking place in the level of the focus signal when the focusing lens moves, the focusing lens being shown in a state of having deviated from an in-focus position.

If it is found, through the steps 1302 and 1303, that the variator-lens is in a position on the wide-angle side thereof and the focusing lens is in a position on the infinity distance side thereof, the flow comes to a step 1304. At the step 1304, the minute driving action is performed on the focusing lens in the same manner as mentioned in the description of the prior art example given in the foregoing. As apparent from FIG. 5, there is nearly no difference in the focusing lens position between the object distances of an infinity distance and 3 meters. Therefore, the in-focus point can be found by minute driving. Since no wobbling is performed in this instance, focus adjustment can be accomplished without blurring the image. If the object of shooting moves from an infinity distance position to a position near the nearest distance position, the focus voltage drops to a great extent. In that instance, the flow proceeds from the step 1301 to a step 1305 to decide the focus adjusting direction by wobbling. After that, the flow comes to a step 1306 to carry out the hill-climbing control, so that the problem of having an excessively long period of time before an in-focus state is attained due to the process of minute driving, for example, can be prevented.

The fourth embodiment is arranged, as described above, to monitor the changes taking place in the focus voltage and the position of each lens and to vary the focusing lens controlling method according to the results of monitoring. The arrangement enables the fourth embodiment to accomplish a steady and stable automatic focusing control, particularly on the wide-angle side.

In a case where a video camera is provided with an image stabilizing mechanism or the like as mentioned in the foregoing, the image stabilizing mechanism permits making a discrimination as to a state in which the camera is currently in process of panning or a state in which the camera is in process of tilting.

Figure 14:
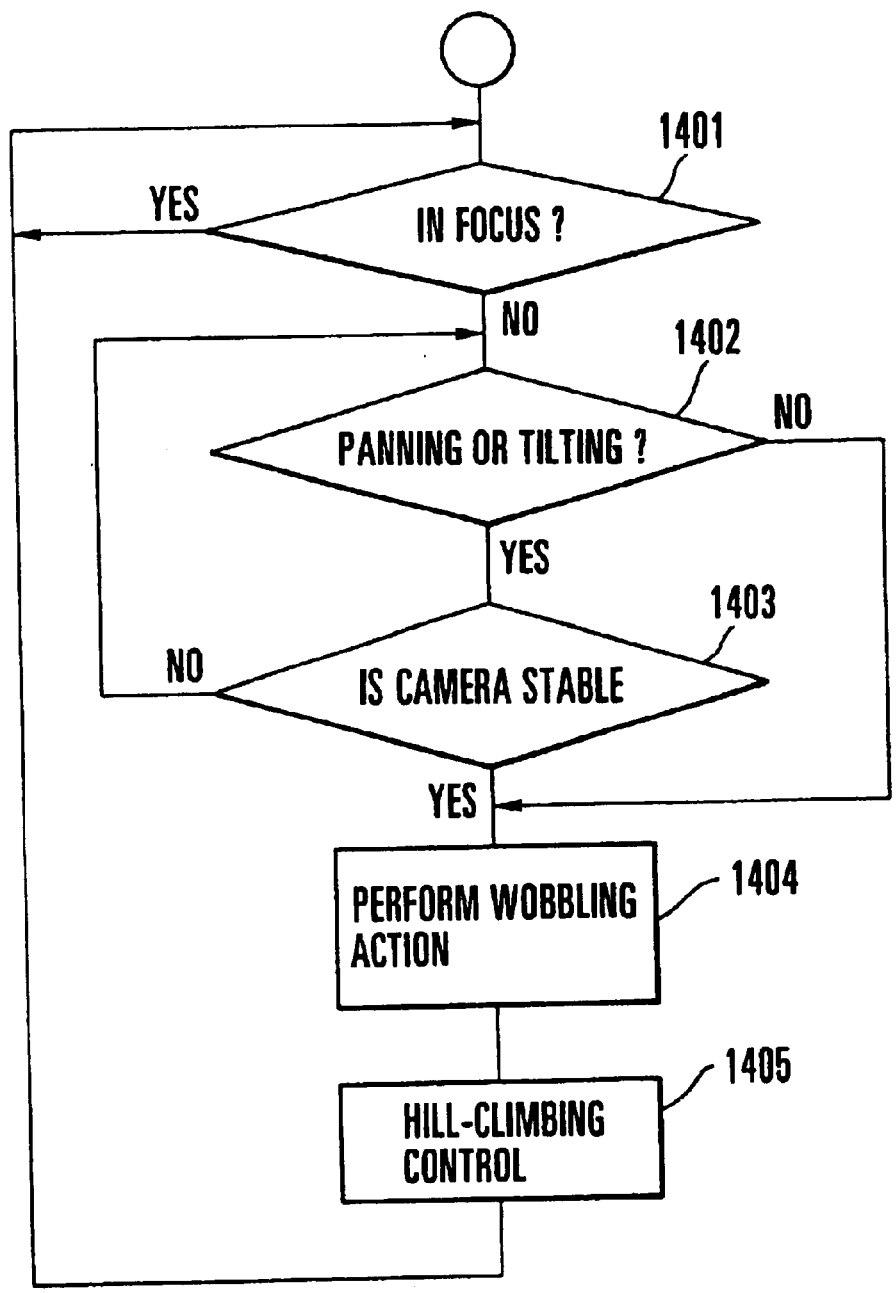
FIG. 14 is a flow chart showing the operation of a fifth embodiment of this invention.

FIG. 14 is a flow chart related to a fifth embodiment of this invention and shows its flow of processes to be executed in a case where information from the above-stated image stabilizing mechanism is utilized for AF control. Referring to FIG. 14, when the state of focus is judged to be out of focus at a step 1401, the embodiment makes a check for panning or tilting on the basis of information obtained from the image stabilizing mechanism. If the camera is found to be neither in process of panning nor in process of tilting, the embodiment performs wobbling at a step 1404 and moves the focusing lens to an in-focus point by carrying out the hill-climbing control at a step 1405. If the camera is found at a step 1402 to be in process of panning or tilting, the flow of operation comes to a step 1403 to make a check for stability of the camera. The check for stability can be made also on the basis of the information from the image stabilizing mechanism. FIG. 15 shows in outline the information (or a signal) from the image stabilizing mechanism in a state obtained when the posture of the camera is deflected. In FIG. 15, a part (period) 1501 indicates that the camera is moved. The signal deflects to a great extent when the camera is moved. If the camera is still moved at the same speed after the part 1501, the signal gradually becomes stable as shown in a part 1502. When the movement of the camera comes to a stop, the signal gradually comes to converge as shown in a next part 1503. In this instance, when the output of the image stabilizing mechanism is in the state as represented at the part 1502, the state of the camera can be deemed to be stable. If the camera is found to be unstable at the step 1403, the flow waits until the state of the camera becomes stable. When it becomes stable, wobbling is carried out at the step 404 to decide the focusing lens driving direction. This flow of operation ensures that the wobbling action is never performed when the focus voltage is fluctuating due to panning or tilting, so that any misjudgement due to focal voltage fluctuations can be avoided in deciding the focusing lens driving direction.

Further, the accuracy of the direction deciding action can be further enhanced by carrying out the processes of this (fifth) embodiment in combination with the processes of the second embodiment.

The automatic focus adjusting device in the above-described embodiments is arranged, as described above, to carry out a preliminary direction deciding action for each of different frequency signals and to finally decide the focusing lens driving direction according to the result of the preliminary direction deciding action. Therefore, the direction deciding action can be reliably and accurately accomplished. Further, the arrangement of controlling the length of time before the direction deciding action while monitoring changes taking place in the focus signal also permits the direction deciding action to be accurately and stably carried out.

The action of detecting a great drop in the focus signal due to quick panning or the like is arranged to be performed before and after the direction deciding action and the action of detecting changes in level of the focus signal is allowed to be performed only after the level of the focus signal increases up to a certain level. Therefore, the automatic focus adjustment can be stably and accurately accomplished without being affected by a disturbance such as panning or the like.

Further, the invented arrangement of varying the method for deciding the focusing lens driving direction according to the amount of changes of the focus voltage and the positions of the focusing lens and the variator lens permits the automatic focus adjusting action to be stably and accurately carried out irrespective of the state of zooming.

Further, since the length of time between detection of a defocused state and commencement of the direction deciding action is arranged to be controlled according to the information from an external device such as the image stabilizing mechanism or the like, the direction deciding action can be accurately accomplished while keeping images in a stable state. In a case where the direction deciding action shows up too much, the method for carrying out this action is changed from one method to another, so that automatic focus adjustment can be smoothly accomplished without impairing the image quality.

The following describes sixth and seventh embodiments of this invention. In the case of the sixth and seventh embodiments, the automatic focus adjusting device is arranged to be capable of stably carrying out the AF action without bringing about any hunting even in the event of a special object of shooting for which the hill-like curve of the sharpness signal only moderately rises. According to the arrangement of the embodiments, the automatic focus adjusting device of the kind driving a focusing lens in such a way as to maximize a sharpness signal obtained from a video signal is arranged to store (information on) the focusing lens position obtained when the level of the sharpness signal becomes a maximum value, to reverse the direction of driving the focusing lens at a point where the level of the sharpness signal decreases from the maximum value by a predetermined level and then to drive the focusing lens back to the position stored. In addition to this focusing lens driving control, the above-stated predetermined level is arranged to be variable either according to the number of times for which the focusing lens driving direction is reversed or according to both the number of focusing lens driving direction reversing times and an aperture value.

The details of the sixth and seventh embodiments are described below including the background of them.

An apparatus of the kind having a two-dimensional image sensor, such as a video camera or the like, has been known as adopting a focusing method whereby the sharpness of a picture is detected from a video signal representing an object image, and the position of a focusing lens is controlled in such a way as to maximize the sharpness thus detected.

The sharpness is generally evaluated by using a sharpness signal representing the intensity of a high frequency component of the video signal extracted by a BPF (band-pass filter) or the detected value of the blurring width of the video signal extracted by a differentiation circuit or the like. This is because the value of such a sharpness signal is small when the picked up image of an ordinary object of shooting is blurred, increases accordingly as the state of blur comes nearer to an in-focus state, and reaches a maximum value when a perfectly in-focus state is attained.

In carrying out focusing control, the focusing lens is moved in the direction in which the value of the sharpness signal increases as fast as possible if the value of sharpness is small. The focusing lens moving speed is lowered accordingly as the sharpness value increases. The hill-climbing control is carried out to bring the focusing lens to a stop accurately at the top of a hill-like curve. Such an automatic focusing (AF) method is called the hill-climbing AF method.

Figure 19:
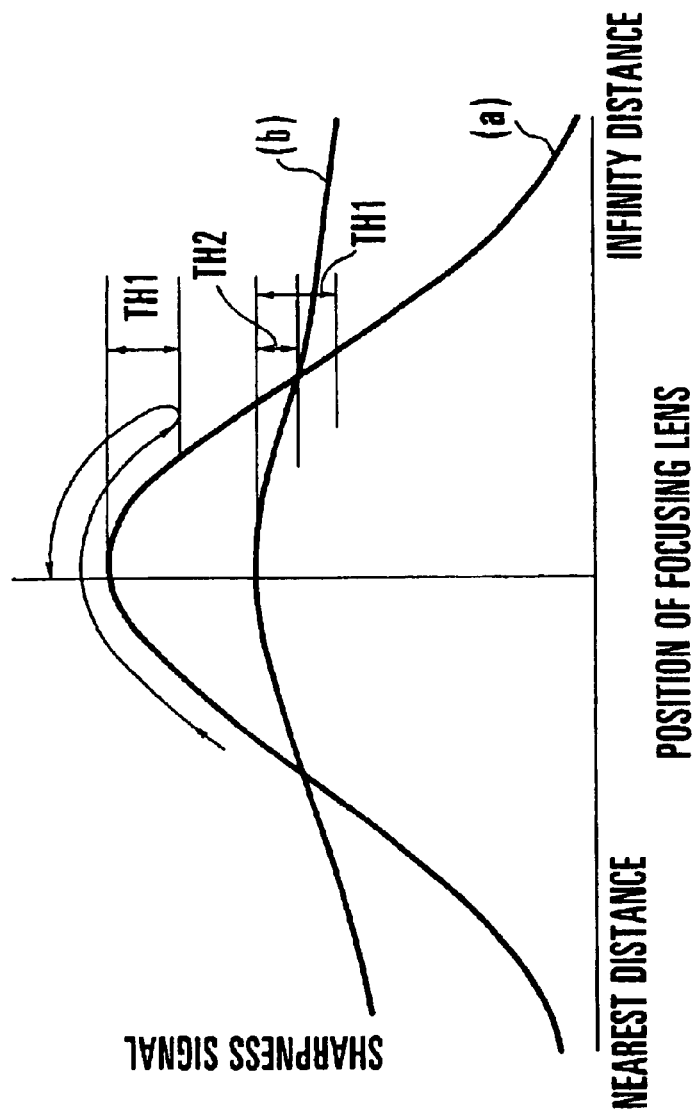
FIG. 19 shows the operation of an automatic focus adjusting device arranged according to this invention through a relation between the position of a focusing lens and the change of a sharpness signal.

The position of the focusing lens is accurately detectable with a stepping motor employed in driving the focusing lens. Therefore, a focusing lens position which is obtained when the sharpness signal is at its maximum value, as indicated by a curve (a) in FIG. 19, is stored. After that, at a point where the value of the sharpness signal comes to decrease from the maximum value by as much as a predetermined threshold value TH1, the focusing lens is moved back to the position where the maximum sharpness signal value is detected. The focusing lens is brought to a stop in this manner at the peak of the hill-like curve representing the sharpness signal.

However, the automatic focus adjusting device of the kind utilizing the video signal has a strong dependency on the object of shooting. As represented by a curve (b) in FIG. 19, the hill-like curve of the sharpness signal comes to be very moderate in the event of an object of low contrast. In such a case, the sharpness signal value sometimes never decreases by more than the predetermined threshold value TH1. Such a condition tends to bring about hunting without moving the focusing lens back to the position where a maximum sharpness signal value has been obtained and thus without finding an in-focus point. If the predetermined threshold value TH1 is set at a sufficiently small value to avoid this trouble, the AF action would become very unstable in the case of an ordinary object, because the focusing lens returning extent would readily be caused to exceed the threshold value TH1 by a noise or the like.

The sixth embodiment of this invention is arranged to solve the above-stated problem and its feature lies in the following arrangement of parts. Extracting means is arranged to extract a signal corresponding to sharpness from a video signal. Driving means is arranged to drive a focusing lens. Position detecting means is arranged to detect the position of the focusing lens. Control means is arranged to cause the focusing lens to be driven by controlling the driving means according to the level of the sharpness signal, to store the focusing lens position obtained when the level of the sharpness signal becomes its maximum value and to cause the focusing lens to be driven back to the focusing lens position stored, by reversing the focusing lens driving direction at a focusing lens position where the level of the sharpness signal drops from the maximum value by a predetermine level. Level control means is arranged to vary the above-stated predetermined level according to information on the focusing lens driving action.

Further, in the automatic focus adjusting device which is the sixth embodiment of this invention, the level control means is arranged to decrease the above-stated predetermined level in a case where the focusing lens driving direction is reversed more than a predetermined number of times.

In the case of the seventh embodiment of this invention which is also an automatic focus adjusting device, the above-stated level control means is arranged to vary the predetermined level on the basis of not only the information on the focusing lens driving action but also information on the depth of field.

The arrangement described above enables the embodiment to stably carry out the AF action without any hunting even for a special object for which the hill-like curve of the sharpness signal is very moderate. Further, by arranging the above-stated predetermined level to be controlled also according to information on an aperture value and information on the number of times for which the focusing lens driving direction has been reversed, the AF action can be also prevented from hunting in the event of an object for which the aperture is stopped down and the hill-like curve of the sharpness signal is moderate.

FIG. 16 is a block diagram showing the circuit arrangement of the automatic focus adjusting device which is the sixth embodiment of this invention. Referring to FIG. 16, a first lens group 151 forms a fixed front lens. A second lens group 152 forms a variator lens, which is arranged to be used for a zooming action through a motor 166 and a motor driving circuit 163. Reference numeral 153 denotes a diaphragm. Reference numeral 154 denotes a third lens group which is fixed. A focusing lens 155 is arranged to be used for focus adjustment through a stepping motor 168 and a motor driving circuit 165. An image sensor 156 is formed with a CCD or the like. A preamplifier 157 is arranged to amplify the output of the image sensor 156. A video signal processing circuit 158 is arranged to perform a predetermined signal processing action on a video signal outputted from the preamplifier 157 into a standardized video signal. An output terminal VO is arranged to output the standardized video signal.

A diaphragm control circuit 159 is arranged to automatically control the diaphragm 153 by controlling the motor driving circuit 164 and an "ig" meter 167 in such a way as to keep the level of the video signal at a predetermined level. A gate circuit 160 is arranged to gate only a portion of the video signal corresponding to an area within a predetermined distance measurement frame set within an image pickup plane. A BPF 161 is arranged to extract from the video signal a frequency component thereof which is to be used as an evaluation value, i.e., a sharpness signal, indicating a degree of sharpness which is necessary in detecting a state of focus. The sharpness signal outputted from the BPF 161 is supplied to a system control circuit 162 which is composed of a microcomputer and is arranged to control the operation of the whole system of the embodiment including the AF action.

A zoom encoder 169 is arranged to detect the position of the variator lens 152 as information on a focal length. An aperture encoder 170 is arranged to detect the aperture value of the diaphragm 153. A focus encoder 171 is arranged to detect the position of the focusing lens 155 as moving position information. The information obtained by each of these encoders are also supplied to the system control circuit 162.

The system control circuit 162 performs AF control to cause the focusing lens 155 to be moved to an in-focus position in a manner as described below on the basis of the values of data obtained from the BPF 161 and the encoders 169, 170 and 171.

FIG. 17 is a flow chart showing the flow of processes to be executed within the system control circuit 162 which represents a feature of the sixth embodiment. Referring to FIG. 17, at a step 1701, the hill-climbing AF action is performed by obtaining the sharpness signal from the BPF 161, the aperture information from the aperture encoder 170, the focal length information from the zoom encoder 169 and the focusing lens position information from the focus encoder 171 in such a way as to cause the level of the sharpness signal to become larger.

As regards the information on the focusing lens position, the use of a stepping motor enables the device to obtain accurate information on the focusing lens position by counting the number of its driving pulses. In the case of this flow chart, the information on the focusing lens position is assumed to be an address.

At a step 1702, a check is made to find if a current sharpness signal value Fa is larger than the peak Fa-p of sharpness signal values obtained until now. If so, the flow comes to a step 1703. At the step 1703, the current sharpness signal value Fa and its address Ad are treated respectively as the peak value Fa-p and a peak value address Ad-p.

At a step 1704, a check is made, while the hill-climbing AF action is in process, to find if the focusing lens driving direction has been reversed two times. If so, the flow comes to a step 1706 to set at TH2 a value TH which has been predetermined for the reversal of the focusing lens driving direction. If not, the flow comes to a step 1705 to set the predetermined value TH at TH1. A state where the focusing lens driving direction has been reversed twice indicates that the object of shooting is some special object which has a low contrast or a high luminance to cause the hill-like curve of the sharpness signal to be moderate, for example, as represented by a curve (b) in FIG. 19 and thus to cause the sharpness signal Fa not to drop to any extent more than the predetermined value TH1. In such a case, therefore, the predetermined value TH is changed over to the other value TH2, which is smaller than the value TH1.

At a step 1707, a check is made to find if a difference value dFa-p between the value Fa-p and the value Fa is smaller than the predetermined value TH. If so, the flow comes to a step 1708. If not, the flow comes to a step 1711. At the step 1708, a check is made to find if the focusing lens is at an infinity distance end position. If so, the flow comes to a step 1710 to reverse the focusing lens driving direction. After the step 1710, the flow comes back to the step 1701 to have the hill-climbing AF action carried on.

If the focusing lens is found at the step 1708 to be not at the infinity distance end position, the flow comes to a step 1709. At the step 1709, a check is made to find if the focusing lens is is at a nearest distance end position. If so, the flow comes to the step 1710 to reverse the focusing lens driving direction and then comes back to the step 1701 to continue the hill-climbing AF action. If not, the flow comes directly back to the step 1701 to allow the hill-climbing AF action to continue in the forward direction without reversing the direction.

Further, if the difference value dFa-p between the value Fa-p and the value Fa is found at the step 1707 to be equal to or more than the predetermined value TH, the flow comes to a step 1711. At the step 1711, the focusing lens is driven to the position of the peak value address Ad-p and this position is regarded as the in-focus point.

As described above, in a case where the focusing lens driving direction is to be reversed twice during the process of the hill-climbing AF action while the hill-like curve of the sharpness signal is very moderate, the value of difference between the value of the sharpness signal obtained at the top of the hill and its value obtained at the skirt of the the hill is less than the predetermined value TH1. In such a case, therefore, the value TH1 is changed over to the smaller value TH2. This arrangement effectively enables the embodiment to find out the in-focus point at the top of the hill without hunting.

A seventh embodiment of this invention is next described as follows. In the case of the sixth embodiment, the focusing lens driving direction is arranged to be reversed at least twice and, in the event of an object of low contrast causing the hill-like curve of the sharpness signal to be very moderate as represented by the curve (b) in FIG. 19, the predetermined value TH1 which is provided for determining a lowered level of the sharpness is changed over to the smaller value TH2. However, in the seventh embodiment, the AF action can be more effectively prevented from hunting for a special object of shooting under a wider range of ambient shooting conditions by arranging the value TH2 to be further variable according to the depth of field. The position sensitivity of the focusing lens varies with the depth of field. When the depth of field is shallow, the position sensitivity of the focusing lens is large and the sharpness signal varies to a greater extent in response to a focusing lens driving amount. When the depth of field is deep, the sensitivity is small and the sharpness signal varies to a less extent in response to the same focusing lens driving amount. This will be understood from FIG. 19. The hill-like curve of the sharpness signal shown in FIG. 19 becomes more moderate accordingly as the depth of field increases. The seventh embodiment of this invention is arranged taking into consideration the change in characteristic arising according to the level of the depth of field.

FIG. 18(c) shows the variations of the value TH2 for different levels of the depth of field. FIG. 18(a) shows the levels of the depth of field obtained by a front lens. The depth of field becomes shallower as these values shown decrease, and becomes deeper as these values increase.

FIG. 18(b) shows the levels of the depth of field obtained by a rear-focus type lens like the lens used in the case of the seventh embodiment. The values shown bear no relation to the focal length.

FIG. 18(c) shows the predetermined value TH2 for each level of the depth of field in the form of a ratio to the predetermined value TH1. Therefore, for example, the value TH2 for a depth of field level "1" is "TH1×0.7". Since the hill-like curve of the sharpness signal becomes more moderate as the depth of field is deeper, the arrangement of setting the value TH2 at a smaller value effectively prevents hunting from occurring where the aperture is stopped down.

As described in the foregoing, while the hill-climbing AF action is in process, the focus lens driving direction is reversed at a point where the level of the sharpness signal has dropped from its peak value as much as a certain predetermined threshold value. The focusing lens is then driven back to its position of an address value at which the peak value of the sharpness signal is obtained. While these processes are being carried on, the above-stated threshold value is set at a smaller value according to the state of reversing the focusing lens driving direction. This arrangement enables the embodiment to reliably, smoothly and quickly move the focusing lens to an in-focus point without causing any hunting even for such a special object of shooting which makes the hill-like curve of the sharpness signal

What is claimed is:

1. An automatic focus adjusting device comprising:

extracting means for extracting a sharpness signal corresponding to sharpness from a video signal;

driving means for driving a focusing lens;

position detecting means for detecting the position of said focusing lens;

control means arranged to cause said focusing lens to be driven by controlling said driving means according to the level of the sharpness signal, to store the position of said focusing lens obtained when the level of the sharpness signal reaches a maximum value and to have said focusing lens driven to the stored position of said focusing lens by causing a driving direction of said focusing lens to be reversed when the sharpness signal decreases from the maximum value by a predetermined level; and level control means for varying the predetermined level according to information on a state of driving said focusing lens.

2. A device according to claim 1, wherein said sharpness signal is a high frequency component of a video signal.

3. A device according to claim 1, wherein the information on the state of driving said focusing lens is a number of times for which the driving direction of said focusing lens have been reversed.

4. An automatic focus adjusting device comprising:

extracting means for extracting a sharpness signal corresponding to sharpness from a video signal;

driving means for driving a focusing lens;

position detecting means for detecting the position of said focusing lens;

control means arranged to cause said focusing lens to be driven by controlling said driving means according to the level of the sharpness signal, to store the position of said focusing lens obtained when the level of the sharpness signal reaches a maximum value and to have said focusing lens driven to the stored position of said focusing lens by causing a driving direction of said focusing lens to be reversed when the sharpness signal decreases from the maximum value by a predetermined level; and level control means arranged to vary the predetermined level according to information on the reversal of the driving direction of said focusing lens and to decrease the predetermined level when the driving direction of said focusing lens have been reversed at least a predetermined number of times.

5. A device according to claim 4, said sharpness signal is a high frequency component of a video signal.

6. An automatic focus adjusting device comprising:

extracting means for extracting a sharpness signal corresponding to sharpness from a video signal;

driving means for driving a focusing lens;

position detecting means for detecting the position of said focusing lens;

control means arranged to cause said focusing lens to be driven by controlling said driving means according to the level of the sharpness signal, to store the position of said focusing lens obtained when the level of the sharpness signal reaches a maximum value and to have said focusing lens driven to the stored position of said focusing lens by causing a driving direction of said focusing lens to be reversed when the sharpness signal decreases from the maximum value by a predetermined level; and level control means for varying the predetermined level according to information on a state of driving said focusing lens and on the depth of field.

7. A device according to claim 6, wherein said sharpness signal is a high frequency component of a video signal.

* * * * *

UNITED STATES PATENT AND TRADEMARK OFFICE
CERTIFICATE OF CORRECTION

PATENT NO. : 6,879,343 B2
DATED : April 12, 2005
INVENTOR(S) : Tatsuya Yamazaki et al.

It is certified that error appears in the above-identified patent and that said Letters Patent is hereby corrected as shown below:

Column 10,
Line 1, delete "microcomputer 1071" and insert -- microcomputer 107' --.

Column 13,
Line 11, delete "variator-lens" and insert -- variator lens --.

Signed and Sealed this

Seventh Day of March, 2006

JON W. DUDAS
*Director of the United States Patent and Trademark Office*